(12) United States Patent
Sabe et al.

(10) Patent No.: US 8,625,859 B2
(45) Date of Patent: Jan. 7, 2014

(54) INFORMATION PROCESSING APPARATUS, INFORMATION PROCESSING METHOD, AND PROGRAM

(75) Inventors: Kohtaro Sabe, Tokyo (JP); Takeshi Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 12/902,744

(22) Filed: Oct. 12, 2010

(65) Prior Publication Data

US 2011/0091071 A1 Apr. 21, 2011

(30) Foreign Application Priority Data

Oct. 21, 2009 (JP) .............................. P2009-242771

(51) Int. Cl.
*G06K 9/00* (2006.01)
(52) U.S. Cl.
USPC ........................... 382/118; 382/203; 382/218
(58) Field of Classification Search
USPC .................... 382/118, 203, 218–222
See application file for complete search history.

(56) References Cited

U.S. PATENT DOCUMENTS

| 6,381,346 | B1* | 4/2002 | Eraslan | 382/118 |
|---|---|---|---|---|
| 6,504,546 | B1* | 1/2003 | Cosatto et al. | 345/473 |
| 6,801,641 | B2* | 10/2004 | Eraslan | 382/118 |
| 7,184,047 | B1* | 2/2007 | Crampton | 345/473 |
| RE42,205 | E * | 3/2011 | Jung et al. | 382/103 |
| 8,111,281 | B2* | 2/2012 | Sangberg et al. | 348/14.01 |
| 2004/0175041 | A1* | 9/2004 | Miller | 382/190 |
| 2005/0162419 | A1* | 7/2005 | Kim et al. | 345/419 |
| 2006/0050933 | A1* | 3/2006 | Adam et al. | 382/118 |
| 2009/0002479 | A1* | 1/2009 | Sangberg et al. | 348/14.02 |
| 2009/0202114 | A1* | 8/2009 | Morin et al. | 382/118 |
| 2010/0149177 | A1* | 6/2010 | Miller | 345/419 |
| 2011/0022965 | A1* | 1/2011 | Lawrence et al. | 715/747 |
| 2012/0113106 | A1* | 5/2012 | Choi et al. | 345/419 |
| 2013/0045804 | A1* | 2/2013 | Ruke | 463/42 |
| 2013/0129141 | A1* | 5/2013 | Wang et al. | 382/103 |
| 2013/0129158 | A1* | 5/2013 | Wang et al. | 382/118 |

FOREIGN PATENT DOCUMENTS

| JP | 08-305836 | 11/1996 |
|---|---|---|
| JP | 10-255017 | 9/1998 |

* cited by examiner

*Primary Examiner* — Aaron W Carter
(74) *Attorney, Agent, or Firm* — Oblon, Spivak, McClelland, Maier & Neustadt, L.L.P.

(57) ABSTRACT

An information processing apparatus including an image acquisition unit that acquires a target image; a face part extraction unit that extracts a face region including a face part from the target image; an identification unit that identifies a model face part by comparing the face part to a plurality of model face parts stored in a storage unit; and an illustration image determination unit that determines an illustration image corresponding to the identified model face part.

19 Claims, 25 Drawing Sheets

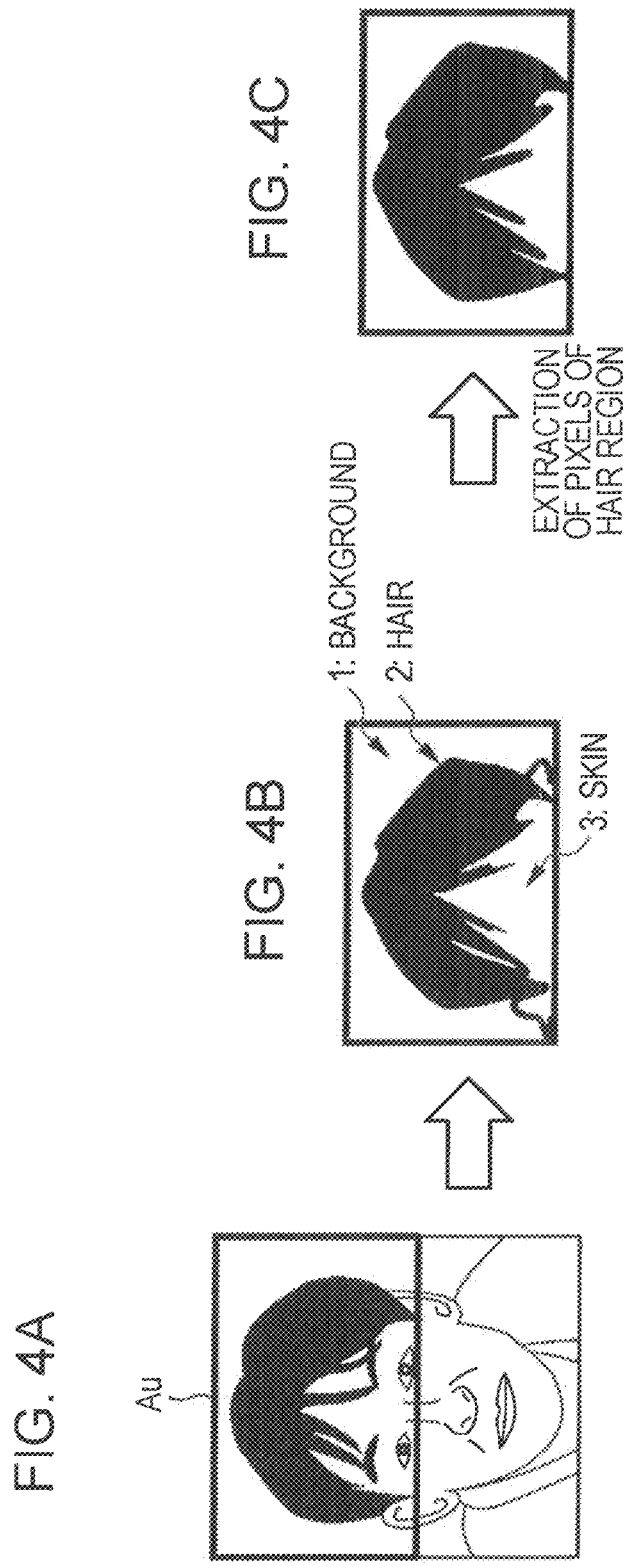

↑ SPLINE CURVE CORRECTION

↑ PAINT HAIR REGION IN BLACK COLOR

↑ PAINT INSIDE OF HAIR REGION AND CONTOUR REGION IN SKIN COLOR

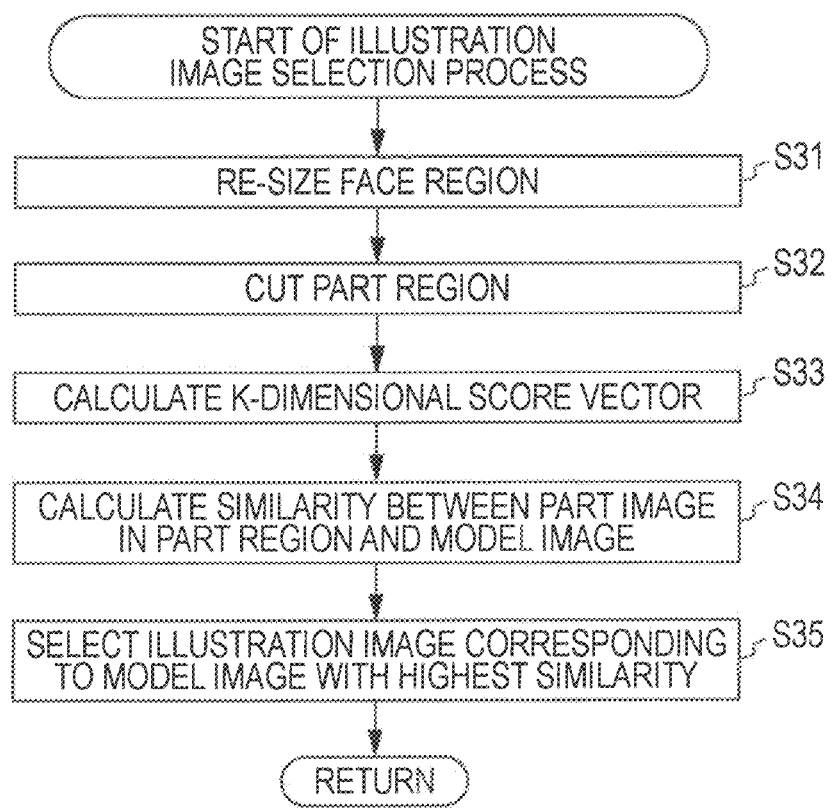

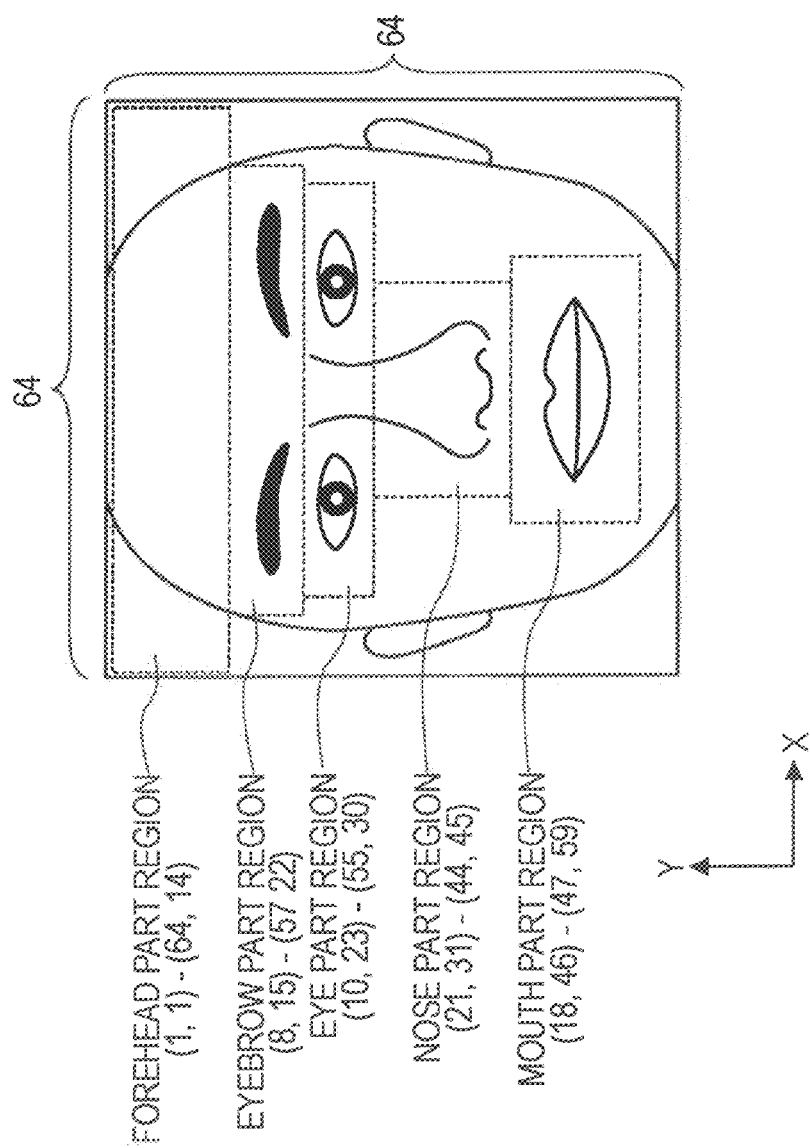

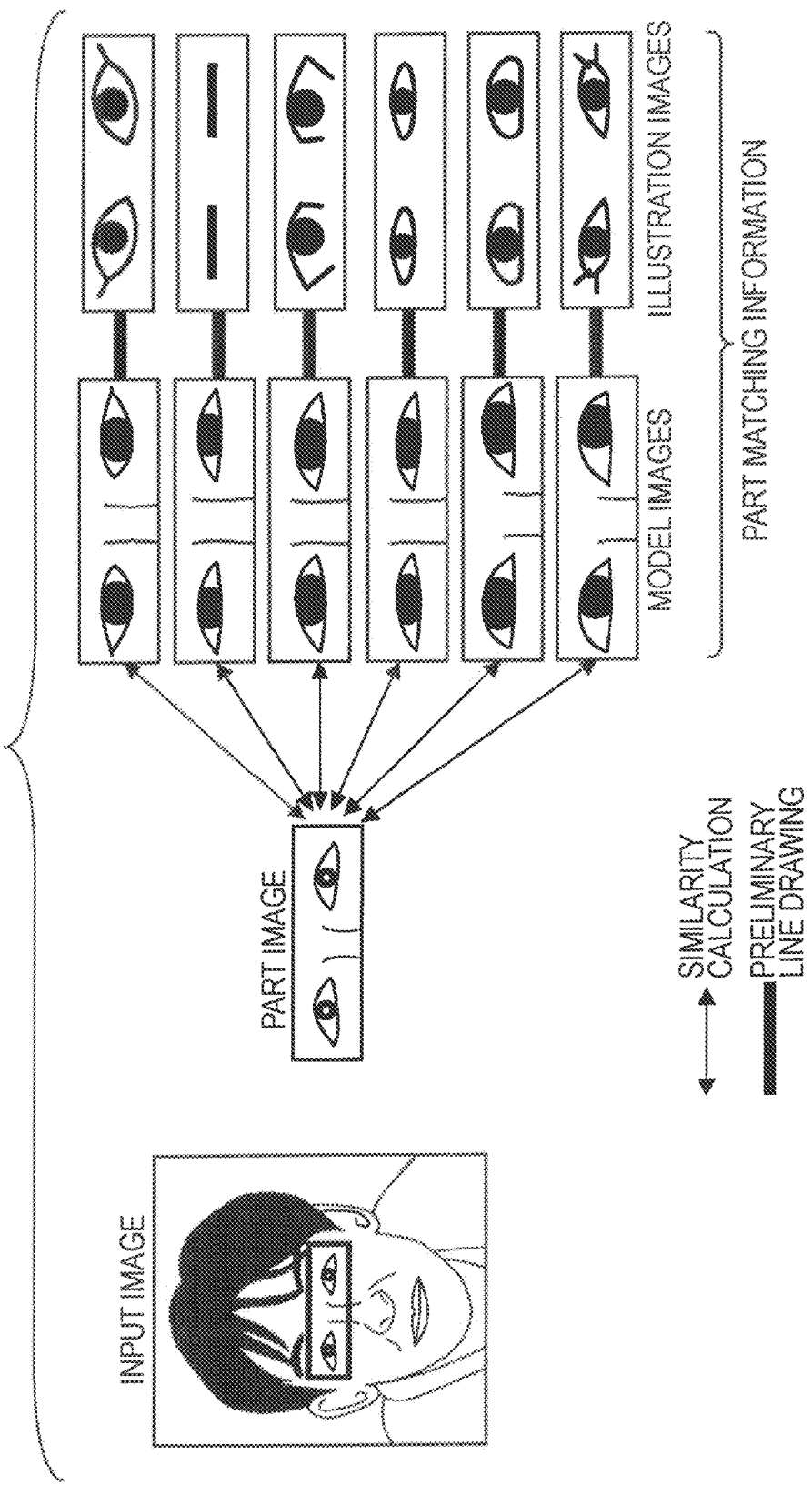

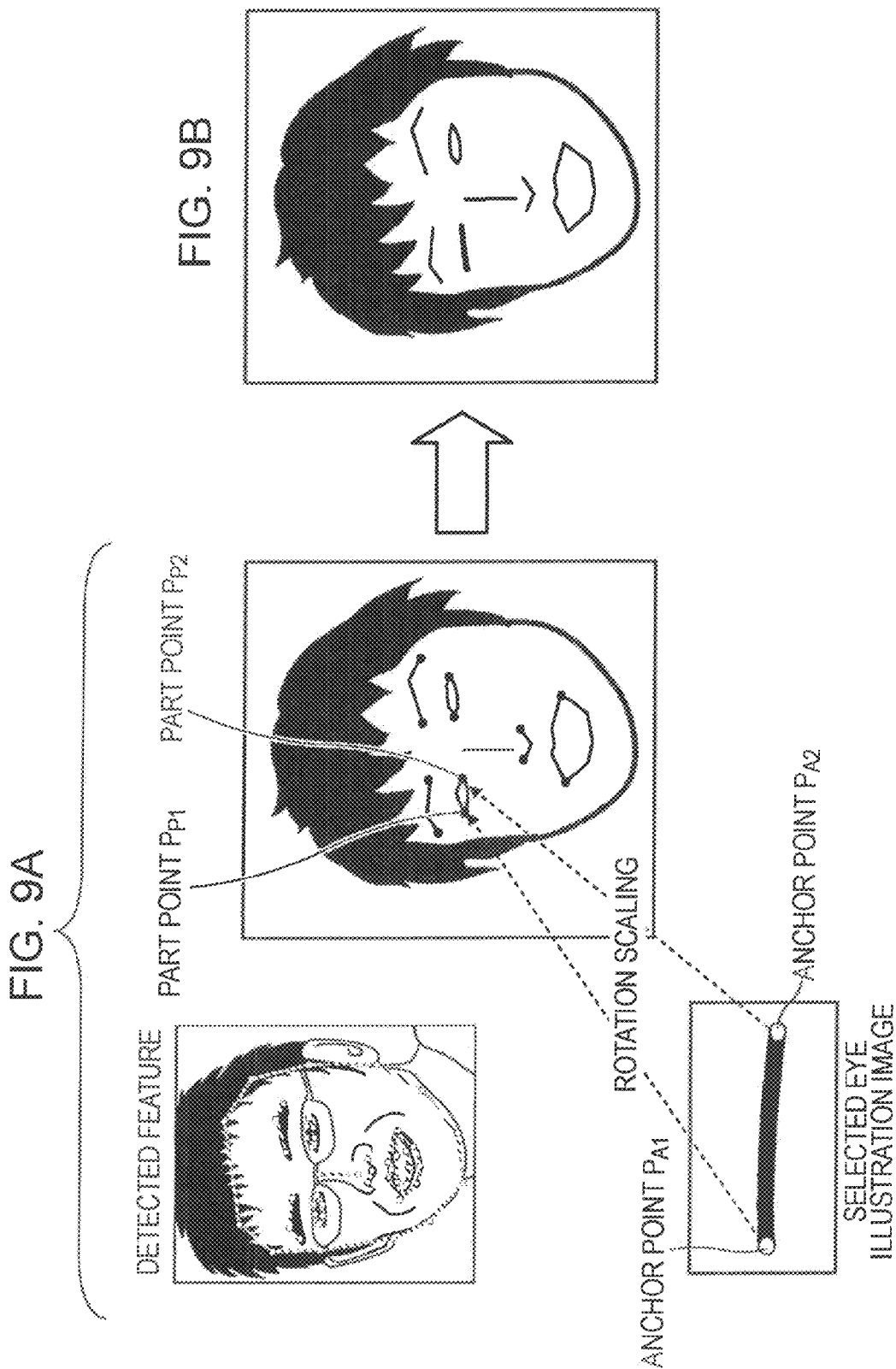

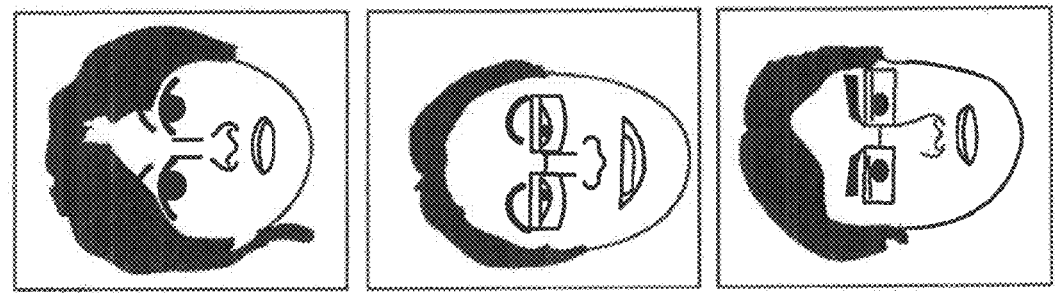
FIG. 10B
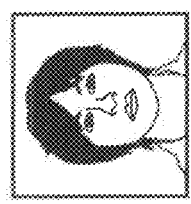 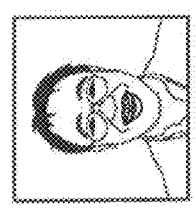 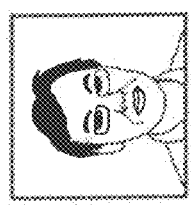
FIG. 10D
FIG. 10F
FIG. 10A
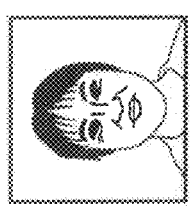 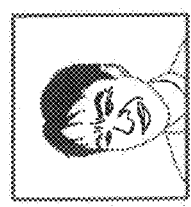 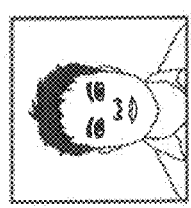
FIG. 10C
FIG. 10E FIG. 15
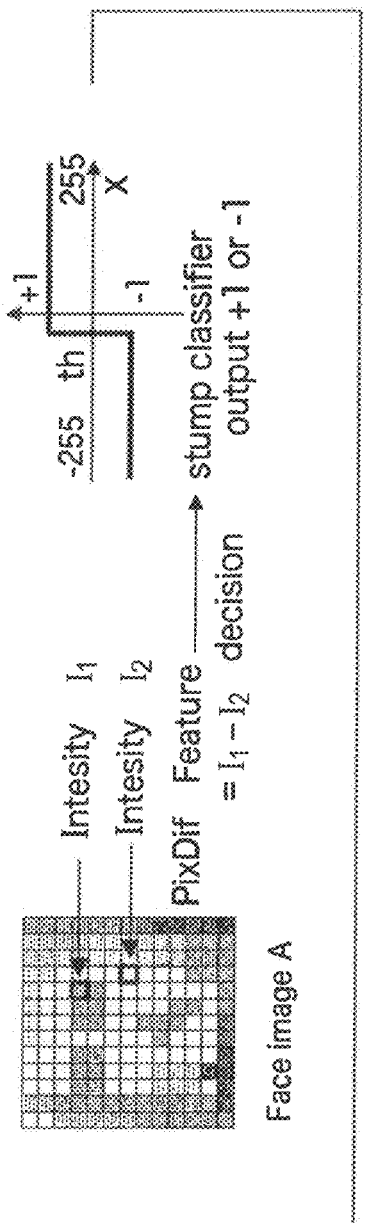
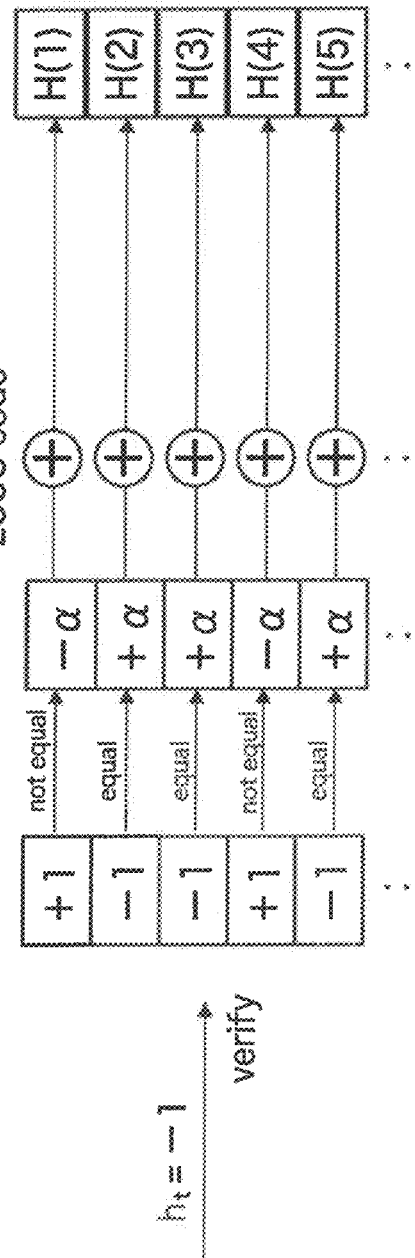

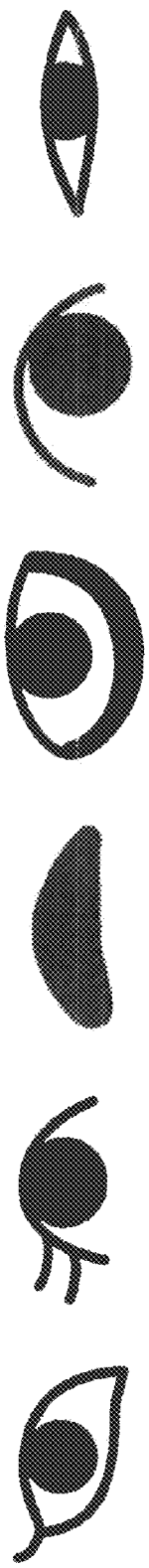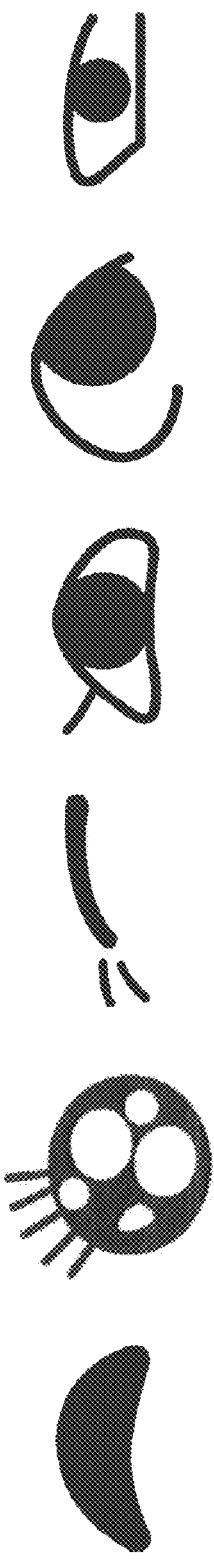

FIG. 20
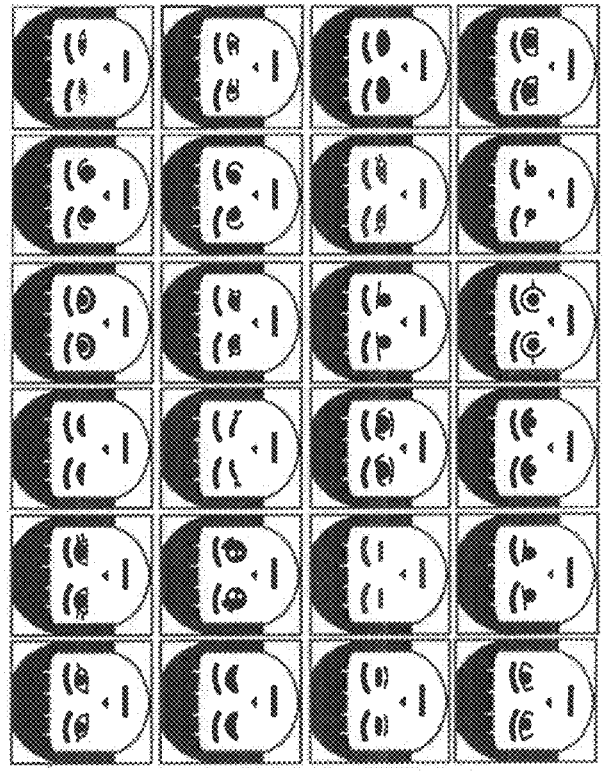
ILLUSTRATION IMAGES
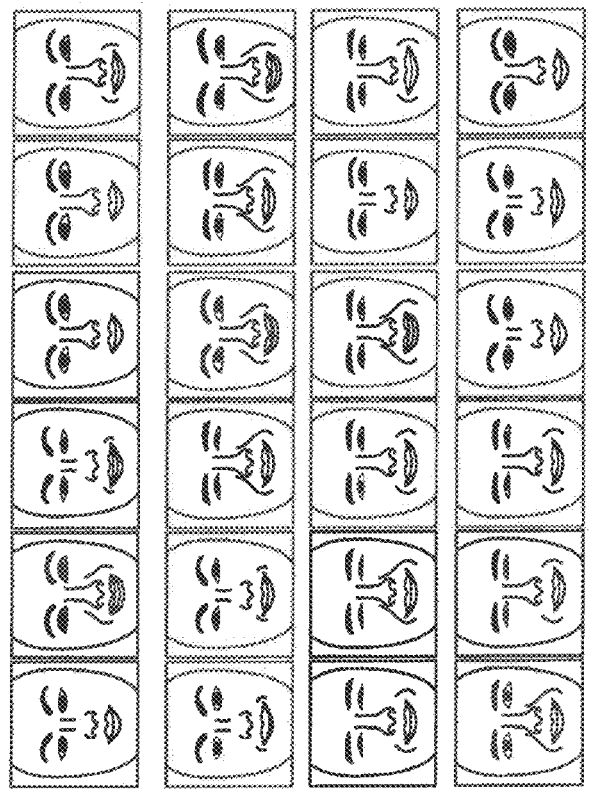
MODEL IMAGES

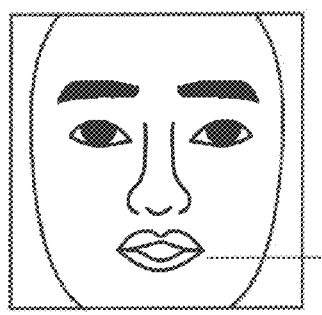
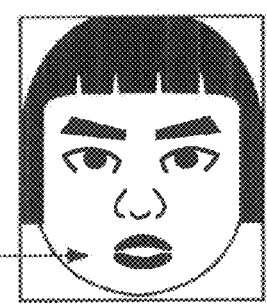
FIG. 21A
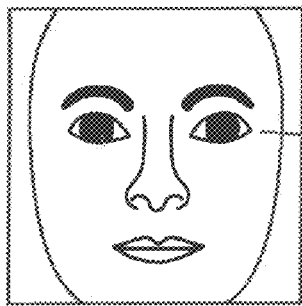
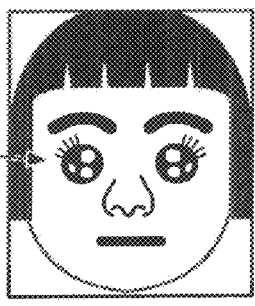
FIG. 21B

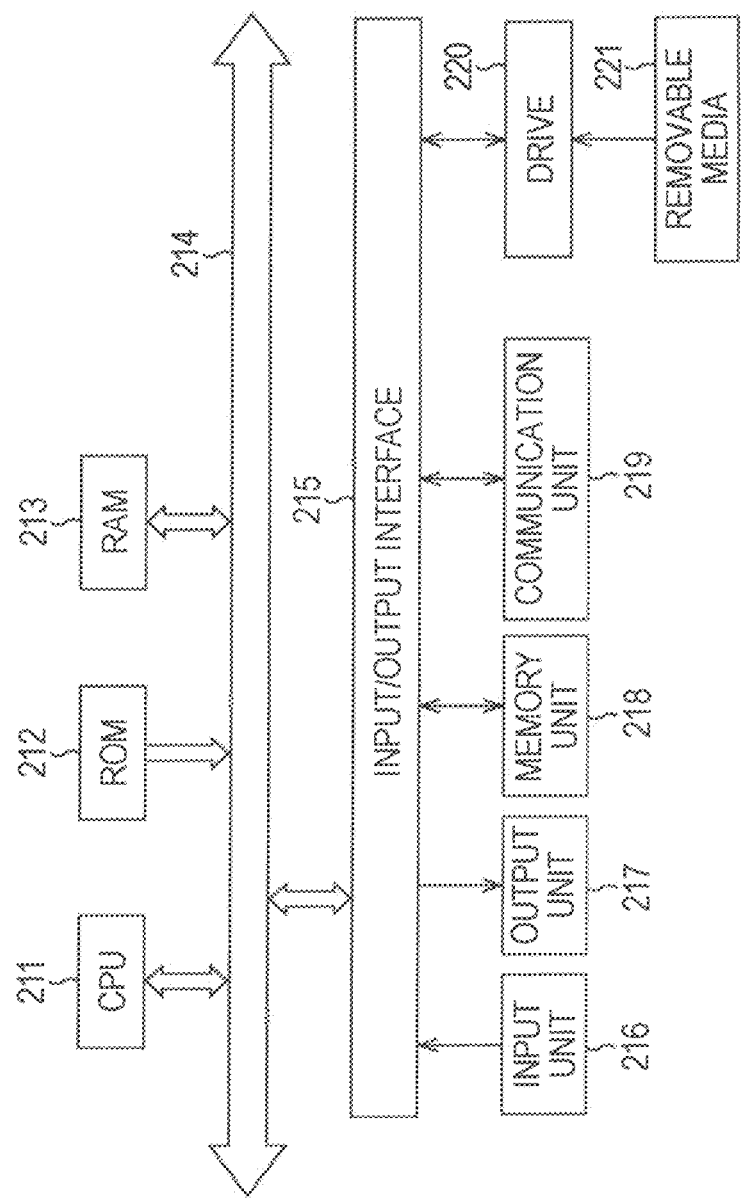

INFORMATION PROCESSING APPARATUS, INFORMATION PROCESSING METHOD, AND PROGRAM

CROSS REFERENCE TO RELATED APPLICATIONS

This application claims the benefit of priority under 35 U.S.C. §119 from Japanese Priority Patent Application JP 2009-242771 filed in the Japan Patent Office on Oct. 21, 2009, the entire contents of which is hereby incorporated by reference.

BACKGROUND OF THE INVENTION

1. Field of the Invention

The present invention relates to an information processing apparatus, an information processing method, and a program, and more particularly, to an information processing apparatus, an information processing method, and a program capable of creating a transformed image on which the feature of a face image is perceived without an operation of a user.

2. Description of the Related Art

In recent years, with development of a face image recognition technique, there has been actualized a technique for creating a similar face picture image from a face image contained in a captured image such as a photograph.

As a method of creating this similar face picture image, there is generally used a method of creating a similar face picture image in accordance with ways using a positional relationship, sizes, ratios, and the like of face part regions extracted from contour images of parts such as eyes, eyebrows, a nose, and a mouth obtained by executing an edge extraction process or the like on a face image in a captured image.

SUMMARY OF THE INVENTION

In the techniques according to a related art, however, the transformed part images for similar face picture images are selected in accordance with the geometric sizes or ratios of part images organizing a face image. Therefore, the features of the face image may not be completely perceived, and a user has to execute an operation when a similar face picture image is created. For this reason, there is a necessity of a technique capable of generating a similar face picture image on which the features of a face image are perceived without an operation of a user.

It is desirable to provide a technique capable of creating a transformed image, such as a similar face picture image, on which the features of a face image are perceived without an operation of a user.

Accordingly, in an exemplary embodiment, the present invention is directed to an information processing apparatus, system, method and/or computer-readable medium that acquires a target image; extracts a face region including a face part from the target image; identifies a model face part by comparing the face part to a plurality of model face parts stored in a storage unit; and determines an illustration image corresponding to the identified model face part.

BRIEF DESCRIPTION OF THE DRAWINGS

FIGS. 4A to 4C are diagrams illustrating the details of a hair region extraction process;

FIG. 6 is a flowchart illustrating the details of an illustration image selection process;

FIG. 7 is a diagram illustrating an example of part region definition information;

FIG. 8 is a diagram illustrating the details of the illustration image selection process;

FIGS. 9A and 9B are diagrams illustrating the details of an illustration image drawing process;

FIGS. 10A to 10F are diagrams illustrating examples of a similar face picture image;

FIG. 15 is a diagram illustrating the details of calculation order of a K-dimensional score vector;

FIGS. 19A to 19L are diagrams illustrating examples of eye illustration images;

FIG. 20 is a diagram illustrating an example where the eye model images are matched to the eye illustration images;

FIGS. 21A and 21B are diagrams illustrating examples where the illustration image is expanded for drawing;

FIG. 25 is a diagram illustrating the configuration of a computer.

DESCRIPTION OF THE PREFERRED EMBODIMENTS

Hereinafter, an embodiment of the invention will be described with reference to the drawings.

Exemplary Configuration of Similar Face Picture Image Generating Device

Figure 1:
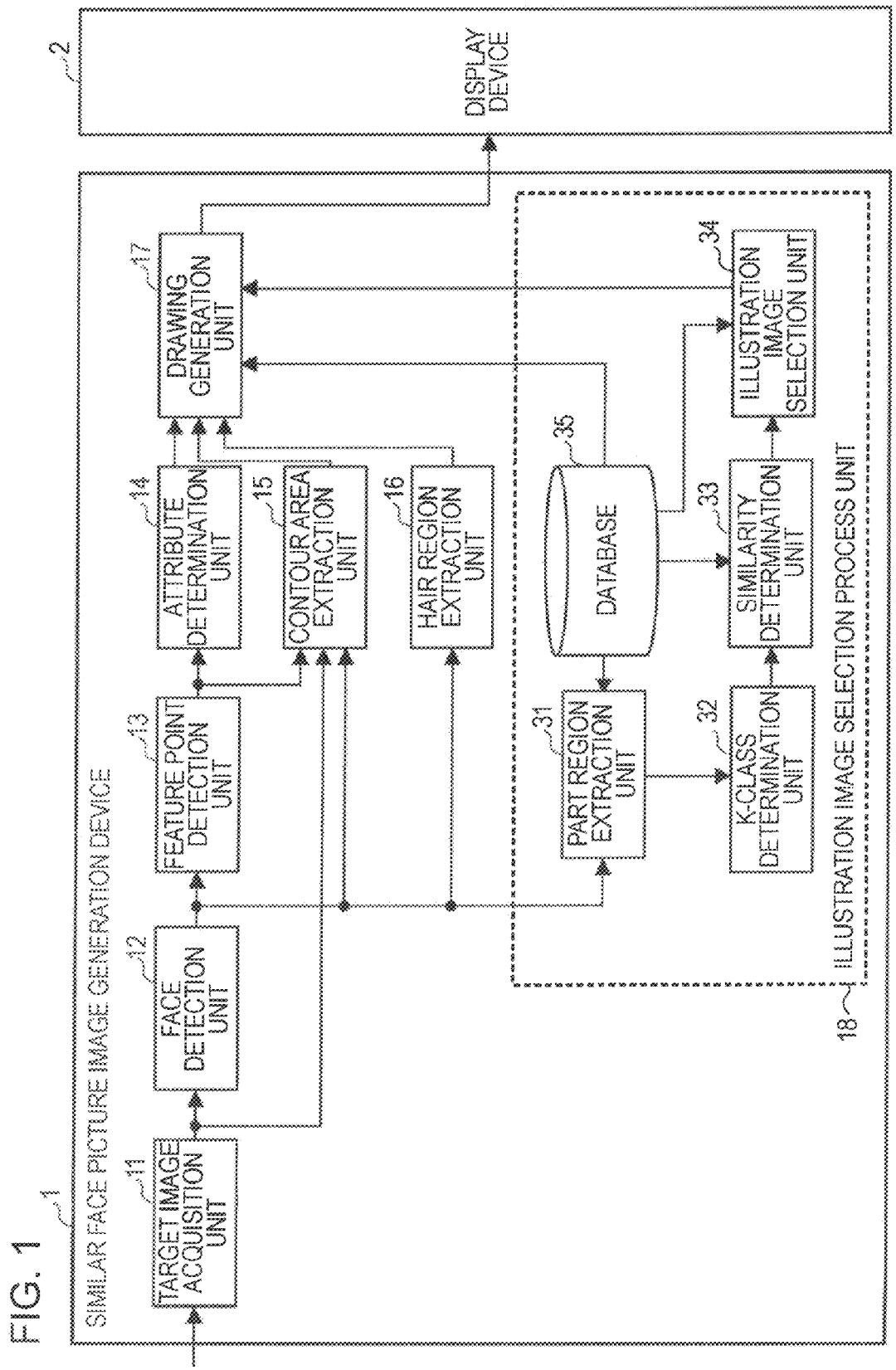
FIG. 1 is a diagram illustrating the configuration of a similar face picture image generation device according to an embodiment of the invention.

FIG. 1 is a diagram illustrating the configuration of a similar face picture image generation device according to an embodiment of the invention.

A similar face picture image generation device 1 shown in FIG. 1 generates a transformed image such as a similar face picture image from a target image containing a face image and displays the transformed image on a display device 2 such as an LCD (Liquid Crystal Display).

As shown in FIG. 1, the similar face picture image generation device 1 includes a target image acquisition unit 11, a face detection unit 12, a feature point detection unit 13, an attribute determination unit 14, a contour region extraction unit 15, a hair region extraction unit 16, a drawing generation unit 17, and an illustration image selection process unit 18.

The target image acquisition unit 11 acquires a target image and supplies the target image to the face detection unit 12 and the contour region extraction unit 15.

For example, when the target image acquisition unit 11 is a camera including an image device such as a lens or a CCD (Charge Coupled Devices), the target image is a captured image captured by the camera. Alternatively, the target image may be an image acquired by reading image data recorded in a record medium such as a memory card or an image acquired from a device connected to a network such as the Internet via the network. That is, the target image may be acquired by any method, as long as the target image contains a face image.

The face detection unit 12 executes a predetermined image process on the target image supplied from the target image acquisition unit 11 to detect the face region. Then, the face detection unit 12 supplies information regarding a face image of the face region obtained by the predetermined image process to the feature point detection unit 13, the contour region extraction unit 15, the hair region extraction unit 16, and the illustration image selection process unit 18.

The feature point detection unit 13 executes a predetermined image process on the face images of the face regions supplied from the face detection unit 12 to detect feature points specifying the contours of parts such as eyes, eyebrows, a nose, and a mouth. Then, the feature point detection unit 13 supplies information regarding the feature point obtained by the predetermined image process to the attribute determination unit 14 and the contour region extraction unit 15.

The attribute determination unit 14 executes a predetermined image process on a face image pattern obtained by positioning the face region in accordance with the feature point supplied from the feature point detection unit 13 to determine a predetermined attribute and determines whether glasses are contained in the face image in the face region, for example. The determination result of the attribute is supplied to the drawing generation unit 17.

The target image from the target image acquisition unit 11, information regarding the face image of the face region from the face detection unit 12, and information regarding the feature point from the feature point detection unit 13 are supplied to the contour region extraction unit 15. The contour region extraction unit 15 executes a re-size process of cutting the region, which is formed by enlarging mainly the face region only at a predetermined magnification ratio, from the target image and matching the cut region to the image size of the similar face picture image to be generated.

When the re-size process is executed, the contour region extraction unit 15 executes a process of converting the position (x, y) of the feature point detected by the feature point detection unit 13 into a position (x, y) in the cut region. The information regarding the contour calculated by the contour region extraction unit 15 is supplied to the drawing generation unit 17.

The hair region extraction unit 16 executes a predetermined image process on the face image (or the target image) in the face region supplied from the face detection unit 12 to extract the hair region. Then, the hair region extraction unit 16 supplies information regarding the hair region obtained in this manner to the drawing generation unit 17.

The illustration image selection process unit 18 executes a process of selecting an illustration image corresponding to a predetermined part such as eyes, eyebrows, a nose, and a mouth in the face region.

The illustration image selection process unit 18 includes a part region extraction unit 31, a K-class determination unit 32, a similarity determination unit 33, an illustration image selection unit 34, and a database 35.

The part region extraction unit 31 extracts a part region containing a predetermined part from the face image in the face region supplied from the face detection unit 12 on the basis of part region definition information. Then, the part region extraction unit 31 supplies the extracted part region to the K-class determination unit 32. The part region definition information is registered in advance in the database 35, for example. Therefore, the part region definition information is acquired from the database 35 by the part region extraction unit 31.

The K-class determination unit 32 requests a K-dimensional score (hereinafter, also referred to as a K-dimensional score vector) regarding the part image in the part region supplied from the part region extraction unit 31. Then, the K-class determination unit 32 supplies the calculated K-dimensional score vector to the similarity determination unit 33.

The K-class determination unit 32 is prepared for each part and is calculated by the preliminary process device 101 shown in FIG. 11, which is described below. The detailed description is made below.

The similarity determination unit 33 specifies the K-dimensional score vector which is the most similar to the K-dimensional score vector supplied from the K-class determination unit 32 among the K-dimensional score vectors of model images corresponding to part matching information registered in the database 35. The similarity determination unit 33 determines the most similar model image and supplies the determination result to the illustration image selection unit 34.

The part matching information is information matching the illustrating image to the model image and is registered in the database 35. The illustration image is an example of the transformed part image formed by transforming and displaying each part and is an image formed by the drawings (illustrations) of drawing each part. The model image is an image generated by classifying part images of input images, which are generated by AdaBoostECOC (Error Correct Output Coding) learning using the image feature amounts of plural sample images and are output from a multi-class determiner (the K-class determination unit 32 shown in FIG. 11, which is described below), into plural prototypes on the basis of multi-dimensional score vectors for the input images and by calculating an average image of a part image group belonging to each prototype.

Figure 11:
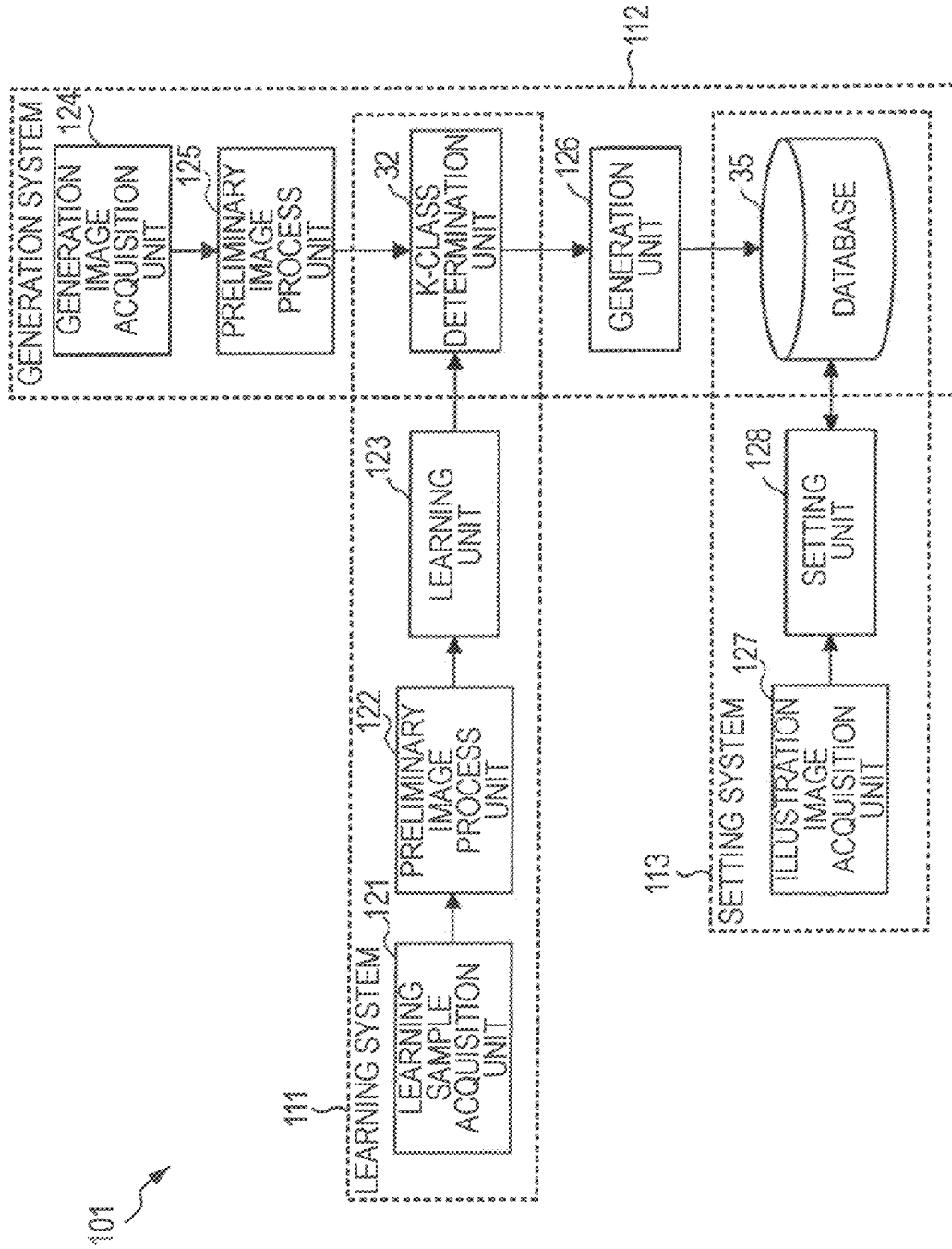
FIG. 11 is a diagram illustrating an exemplary configuration of a preliminary process device.

The part matching information is calculated by the preliminary process device 101 shown in FIG. 11. The detailed description is made below.

The illustration image selection unit 34 selects an illustration image matched to the model image determined to be the most similar among the part matching information registered in the database 35 on the basis of the determination result supplied from the similarity determination unit 33. Then, the illustration image selection unit 34 supplies the selected illustration image to the drawing generation unit 17.

The database 35 stores various kinds of information necessary for creating the similar face picture image such as anchor point definition information, as well as the part region definition information and the part matching information described above. The anchor point definition information defines a point (hereinafter, also referred to as an anchor point) on the illustration image matched to the position (hereinafter, also referred to as a part point) of each part detected from the face image contained in the target image. The anchor point definition information is calculated by the preliminary process device 101 shown in FIG. 11. The detailed description is made below.

The determination result from the attribute determination unit 14, the information regarding the contour from the contour region extraction unit 15, the information regarding the hair region from the hair region extraction unit 16, the illustration image from the illustration image selection unit 34, and the anchor point definition information from the database 35 are supplied to the drawing generation unit 17.

The drawing generation unit 17 paints the entire region of the sum sets of the contour region and the hair region in a predetermined skin color on the basis of the information regarding the contours and the hair region and paints the entire hair region in a predetermined hair color to draw an image (hereinafter, also referred to as a base image) formed only by the skin region and the hair region. Subsequently, the drawing generation unit 17 executes a predetermined image process such as rotation or scaling (re-sizing) on the illustration image so that the anchor point defined on the basis of the anchor point definition information is matched to the part point. Then, the drawing generation unit 17 draws and disposes the illustration obtained in this manner to the base image to generate the similar face picture image.

The drawing generation unit 17 further disposes a glasses image on the basis of the anchor point definition information, when the determination result from the attribute determination unit 14 indicates glasses.

The similar face picture image generated in this manner is displayed on the display device 2 by the drawing generation unit 17.

The similar face picture image generation device 1 has the above-described configuration.

Description of Similar Face Picture Image Generation Process

Next, a process (similar face picture image generation process) of generating the similar face picture image, which is executed by the similar face picture image generation device 1 shown in FIG. 1, will be described with reference to the flowchart of FIG. 2.

Figure 2:
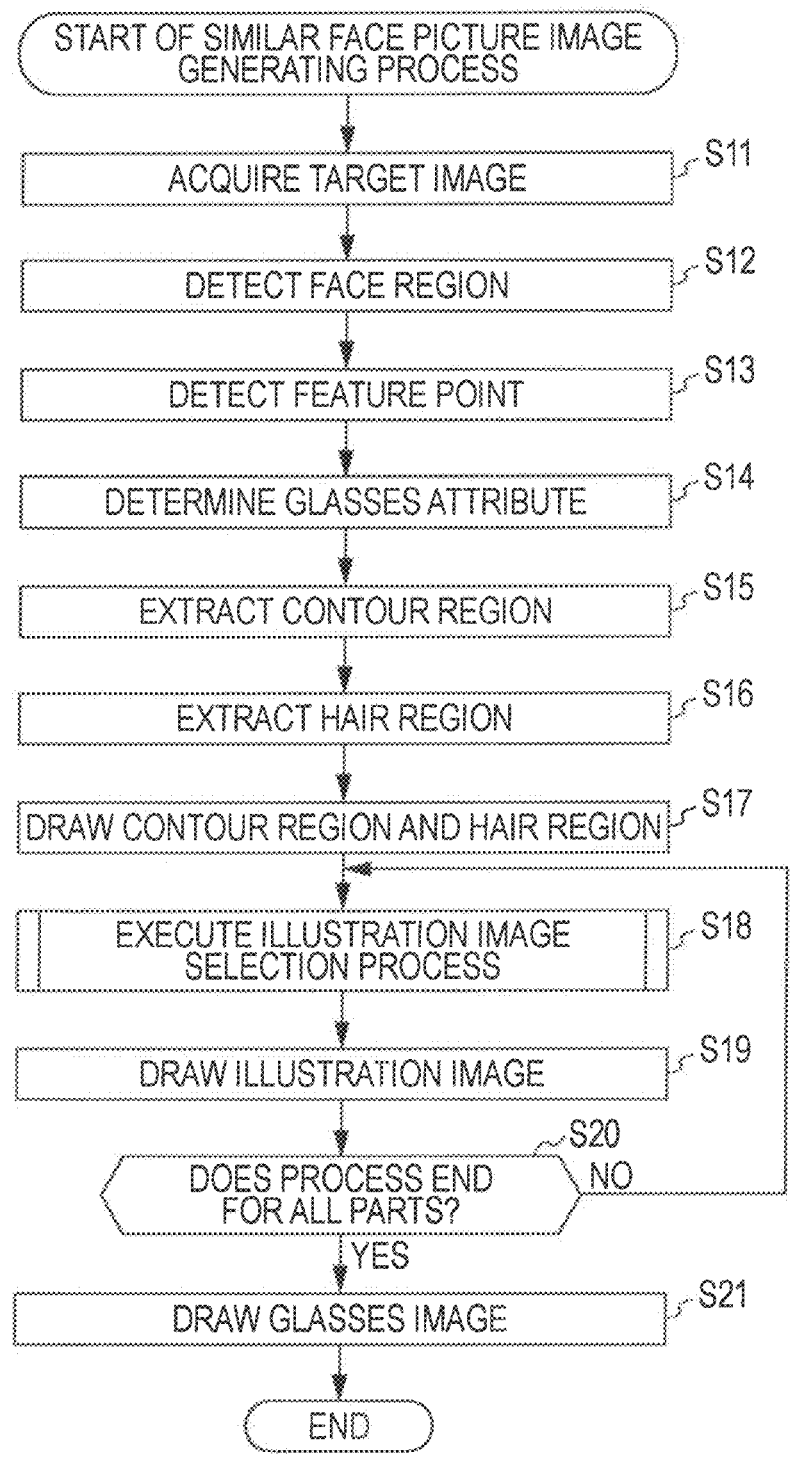
FIG. 2 is a flowchart illustrating a similar face picture image generation process.

In the description made with reference to FIG. 2, the overall routine of FIG. 3 is frequently referred to facilitate understanding of the process executed in each step.

Figure 3A:
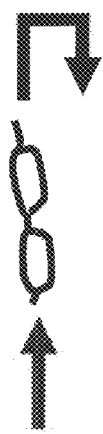
FIGS. 3A to 3H are diagrams illustrating the overall routine of the similar face picture image generation process.
Figure 3B:
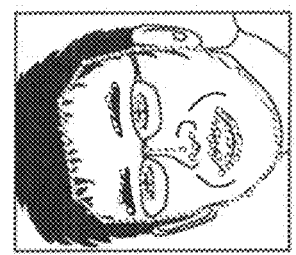
Figure 3C:
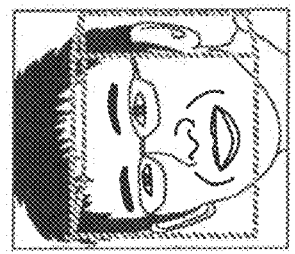

In step S11, the target image acquisition unit 11 acquires the target image containing the face image such as a captured image. For example, the target image containing the face image shown in FIG. 3A is input to the target image acquisition unit 11.

In step S12, the face detection unit 12 detects the position (x, y, w, h) of the face region in the target image by scanning a face pattern of the target image supplied from the target image acquisition unit 11. For example, the face detection unit 12 detects a region, which is indicated by a rectangle overlapping with a face of FIG. 3B, as the face region.

In step S13, the feature point detection unit 13 detects the position (x, y) of the feature point by scanning the pattern of each feature point of the face image in the face region detected by the face detection unit 12. The part and contour are specified by the feature point. For example, the feature point detection unit 13 detects the feature point indicated by the point overlapping on the face of FIG. 3C.

Figure 3D:
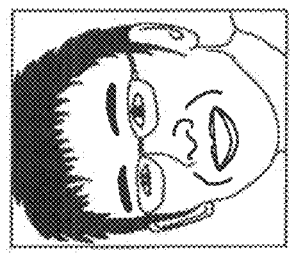

In step S14, the attribute determination unit 14 determines the attribute of the face image pattern obtained by positioning the face region in accordance with the feature point of eyes or the like detected by the feature point detection unit 13. Then, the attribute determination unit 14 determines whether the glasses exist. For example, as shown in FIG. 3D, the attribute determination unit 14 determines the glasses attribute from the face image pattern. In this case, the attribute determination unit 14 determines that the glasses exist.

In step S15, the contour region extraction unit 15 executes the re-size process of cutting the region, which is formed by enlarging mainly the face region detected by the face detection unit 12, from the target image and matching the cut region to the image size of the similar face picture image to be generated. As for the re-size, the region is extracted to the degree that the entire face slightly protrudes in the face region detected by the face detection unit 12. Therefore, for example, the region which is about 1.6 times the face region is cut from the target image.

At this time, for example, when it is assumed that the image size of the similar face picture image desired to be calculated is 300 by 300 pixels, the face image in the detected face region is re-sized to this image size. At this time, the contour region extraction unit 15 transforms the position of the feature point of the face region detected by the feature point detection unit 13 to the position of the cut image. Then, the contour region extraction unit 15 supplies the transformed position of the feature point to the drawing generation unit 17.

In step S16, the hair region extraction unit 16 clusters RGB values, which are obtained from the image of a region (region of the top of a head) of the upper half of the face image in the face region (or the target image) detected by the face detection unit 12, using a k-means algorithm, for example. Then, the hair region extraction unit 16 extracts a predetermined region as the hair region.

FIGS. 4A to 4C are diagrams illustrating the details of a hair region extraction process executed by the hair region extraction unit 16.

In the hair region extraction process, as shown in FIG. 4A, an upper face region $A_U$ corresponding to the upper half of the face region is first extracted. When all pixels (r, g, b) of the upper face region $A_U$ are clustered into three colors using the k-means algorithm, all pixels belong to any one of three classes. Subsequently, when it is determined whether the labels of pixels adjacent to each other are identical to each other, the upper face region is divided into three regions of background, hair, and skin regions, as shown FIG. 4B.

In this division process, the upper face region may be divided into three or more regions. However, as shown in FIG. 4C, the hair region extraction unit 16 may extract the region with the largest area as the hair region from the region closest to black, for example.

Figure 3E:
Figure 3F:
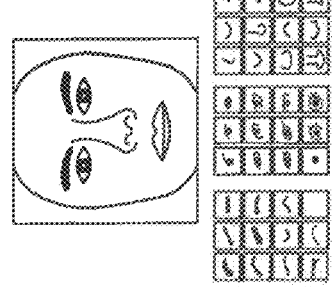
Figure 3G:

Returning to the flowchart of FIG. 2, in step S17, the drawing generation unit 17 paints the entire region of the sum set of the contour region and the hair region in a predetermined skin color and paints the entire hair region in a predetermined hair color to draw a face base image. As shown in FIG. 3E, the extracted contour region is first drawn. Thereafter, as shown in FIG. 3F, the base image is drawn by drawing the extracted hair region.

FIGS. 5A to 5D are diagrams illustrating the details of a base image drawing process executed by the drawing generation unit 17.

Figure 5B:
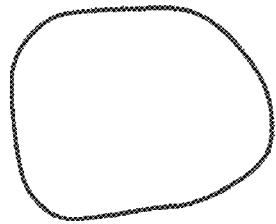
FIGS. 5A to 5D are diagrams illustrating the details of a drawing process.
Figure 5D:
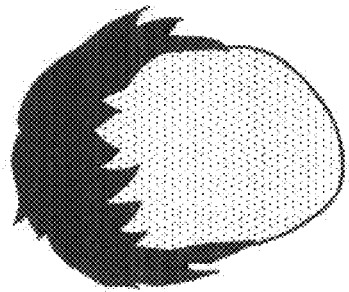
Figure 5A:
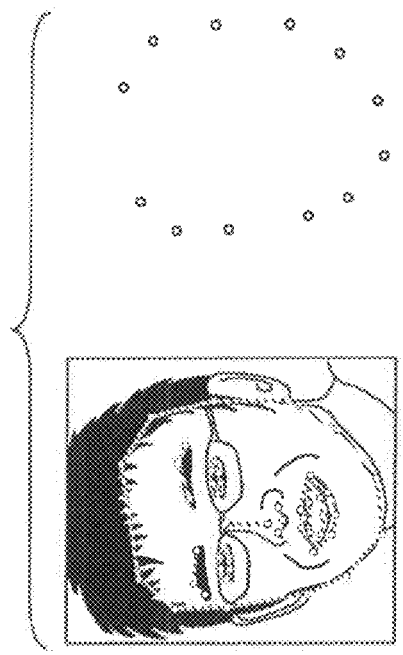
Figure 5C:
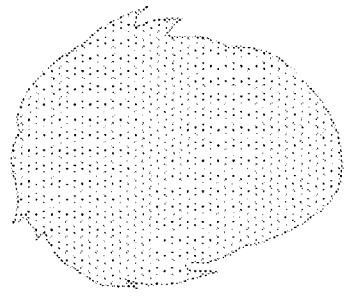

As shown in FIG. 5A, the feature points of the detected contour can be connected to each other by a predetermined interpolation process such as spline curve interpolation. When the region surrounded by a curve is calculated, the contour region shown in FIG. 5B is obtained. As shown in FIG. 5C, the entire contour region and the inside of the hair region extracted by the hair region extraction unit 16 are painted in the skin color, and then only the hair region is painted in black (hair color). In this way, the base image shown in FIG. 5D can be obtained.

Returning to the flowchart of FIG. 2, in step S18, the illustration image selection process unit 18 executes an illustration image selection process. The illustration image selection process is a process corresponding to selection of the illustration image shown in FIG. 3G.

Hereinafter, the details of the illustration image selection process of step S18 shown in FIG. 2 will be described with reference to the flowchart of FIG. 6. Here, to facilitate the description, an example will mainly be described in which the illustration image of eyes is selected among parts of eyes, eyebrows, a nose, and a mouth.

In step S31, the illustration image selection process unit 18 re-sizes the image size of the face region of the target image to a predetermined image size. Then, the part region extraction unit 31 cuts out the part region from the face region re-sized to the predetermined image size in accordance with the part region definition information.

FIG. 7 is a diagram illustrating an example of the part region definition information.

As shown in FIG. 7, when respective part regions are cut from the face region re-sized to the size of 64 by 64 pixels, a rectangular region where an arbitrary point $(x_1, y_1)$ and an arbitrary point $(x_2, y_2)$ in the face region are diagonal corners is extracted. For example, since an eye part region is a rectangular region where the point (10, 23) and the point (55, 30) are diagonal corners, the part region extraction unit 31 cuts and extracts this region as the eye part region.

Returning to the flowchart of FIG. 6, in step S33, the K-class determination unit 32 for the eye part region calculates a K-dimensional score vector corresponding to the part image in the eye part region.

In step S34, the similarity determination unit 33 specifies the K-dimensional score vector, which is the most similar to the K-dimensional score vector obtained from the part image in the eye part region calculated by the K-class determination unit 32 for the eye part region among the K-dimensional score vectors of the model images matched to the illustration images on the basis of the part matching information registered in the database 35. Then, the similarity determination unit 33 determines the most similar model image. Moreover, in the similarity between the K-dimensional score vectors, Euclidean distance is used.

In step S35, the illustration image selection unit 34 selects the illustration image matched to the model image determined to be the most similar from the part matching information registered in the database 35 on the basis of the determination result of the similarity determination unit 33.

FIG. 8 is a diagram illustrating the details of the illustration image selection process.

As shown in FIG. 8, when the part region extraction unit 31 extracts the part image in the eye part region from the face region of the target image, the similarity determination unit 33 determines the similarity between the part image and the plural model images on the basis of the calculation result of the K-class determination unit 32 and determines the model image with the highest similarity. Since the model images and the illustration images are matched to each other in advance in the part matching information, the illustration image selection unit 34 can select one illustration image matched to the model image with the highest similarity.

In this way, one illustration image matched to the model image which is the most similar to the part image in the eye part region extracted from the face region is selected from the prepared plural illustration images in advance. Then, the process returns to step S18 of FIG. 2.

In step S19, the drawing generation unit 17 executes an image process, such as rotation or scaling, on the illustration image selected by the illustration image selection unit 34 so that the anchor points defined by the anchor point definition information are identical to the corresponding part points. Then, the drawing generation unit 17 draws the illustration image obtained in this manner on the base image obtained in step S17.

FIGS. 9A and 9B are diagrams illustrating the details of an illustration image drawing process.

As shown in FIGS. 9A and 9B, anchor points $P_A$ of the eye illustration image selected by the illustration image selection unit 34 can be matched to part points Pp on the similar face picture image (base image) corresponding to the feature points of the face region detected by the feature point detection unit 13, as described above.

That is, as shown in FIG. 9A, since one anchor point $P_{A1}$ is matched to the part point $P_{P1}$ and the other anchor point $P_{A2}$ is matched to the part point $P_{P2}$, the drawing generation unit 17 executes the image process such as rotation or scaling on the illustration image so that the eye illustration image is drawn on the base image by matching these points. Then, the drawing generation unit 17 executes drawings so that the anchor points $P_A$ are matched to the part points $P_P$. In this way, when the drawing is executed, as shown in FIG. 9B, a right eye illustration image is drawn on the base image.

At this time, since the skin region is drawn beforehand as the base image, only the pixels corresponding to the illustration image are overwritten. The part points $P_P$ may be points matching the detected feature points or may be points set separately from the feature points.

Returning to the flowchart of FIG. 2, in step S20, the illustration image selection process unit 18 determines whether all illustration images such as eyes, eyebrows, a nose, a mouth, and a forehead are drawn on the base image.

When it is determined all illustration images are not drawn in step S20, the process returns to step S18, and then the illustration image selection drawing process from step S18 to S20, which are described above, is repeated.

That is, by repeating the illustration image selection drawing process, an eyebrow part region (point (8, 15)-point (57, 22)), a nose part region (point (21, 31)-point (44, 45)), a mouth part region (point (18, 46)-point (47, 59)), and a forehead part region (point (1, 1)-point (64, 14)) other than the eye part region defined in the part region definition information in FIG. 7 are respectively extracted. Then, the similarity with the model images is determined using the K-class determination unit 32 prepared in each part region, and each illustration image matched to the model image with the highest similarity is selected. The selected illustration image is subjected to the image process on the basis of the anchor point definition information. Then, the illustration image is drawn and disposed at a predetermined position on the base image.

Figure 3H:
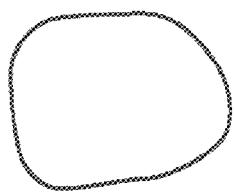

Alternatively, when all illustration images are completely drawn, the process proceeds to step S21. In step S21, the drawing generation unit 17 draws an image of a frame of the glasses at a predetermined position on the base image on the basis of the anchor point definition information, when the determination result of the glasses attribute from the attribute determination unit 14 represents that the glasses exist. In this way, the similar face picture image shown in FIG. 3H is generated.

The similar face picture image generated in this manner is exemplified as follows. That is, FIGS. 10A to 10F are diagrams illustrating examples where the similar face picture image (transformed image) generated by the drawing generation unit 17 is displayed on the display device 2.

As indicated by combinations of the target images (left side) and the similar face picture images (right side) shown in FIGS. 10A to 10F, each illustration image matched to each part region of the face image contained in the target image on the left side is selected separately by executing the above-described similar face picture image generation process. The selected illustration image is drawn on the base image. Then, each similar face picture image on the right side is generated.

That is, the similar face picture image is generated from the illustration image selected not on the basis of the similarity between the part image in each part region and the illustration image but on the basis of the similarity between the part image and the model image. Therefore, the illustration image matched to the model image which is the most similar to each part image of the target image can be selected directly from the appearance of the face image and thus the similar face picture image on which the features of the face image is perceived can be generated. That is, it is difficult to directly calculate the similarity between the part image and the illustration image. In this embodiment, however, the illustration image is matched in advance to the model image, the similarity between the part image and the model image is calculated, and the illustration image matched to the model image which is the most similar to the part image is selected.

In this way, the similar face picture image generation process is executed.

Exemplary Configuration of Preliminary Process Device

Next, a learning process of generating the K-class determination unit 32, a generation process of generating the model image, and a setting process of setting various kinds of information such as the part matching information and the anchor point definition information will be described which are executed as preliminary processes necessary for executing the similar face picture image generation process by the similar face picture image generation device 1 in FIG. 1. The preliminary processes are executed by the preliminary process device.

FIG. 11 is a diagram illustrating an exemplary configuration of the preliminary process device.

As shown in FIG. 11, the preliminary process device 101 includes a learning system 111 executing a learning process, a generation system 112 executing a generation process, and a setting system 113 executing a setting process.

A learning sample acquisition unit 121, a preliminary image process unit 122, a learning unit 123, and a K-class determination unit 32 belong to the learning system 111. A generation image acquisition unit 124, a preliminary image process unit 125, the K-class determination unit 32, a generation unit 126, and the database 35 belong to the generation system 112. An illustration image acquisition unit 127, a setting unit 128, and the database 35 belong to the setting system 113.

In FIG. 11, the same reference numerals are given to the elements corresponding to the elements of FIG. 1, and the description is appropriately omitted. That is, in FIG. 11, the same K-class determination device 32 and the same database 35 shown in FIG. 1 are described. However, in the preliminary process device 101, the K-class determination unit 32 forming the similar face picture image generation device 1 is generated and various kinds of information are set to execute a process of registering the K-class determination unit 32 and the various kinds of information in the database 35.

First, the learning system 111 will be described.

The learning sample acquisition unit 121 acquires a face image (hereinafter, also referred to as a sample image) prepared in various variations for K (where K=1, 2, . . . , K) sample persons and supplies the acquired face image to the preliminary image process unit 122.

The preliminary image process unit 122 executes a process of detecting the face region from the sample image supplied from the learning sample acquisition unit 121 and re-sizing the face region to a predetermined image size. In the re-size process, the face region is re-sized to the image size defined in the above-described part region definition information (see FIG. 7). The preliminary image process unit 122 cuts out the part region on the basis of the part region definition information from the re-sized face region and supplies the part region to the learning unit 123.

The learning unit 123 calculates the image feature amount of the part image in the part region supplied from the preliminary image process unit 122, learns plural weak determiners using AdaBoostECOC (Error Correct Output Coding), and generates the K-class determination unit 32 formed by the plural weak determiners.

Next, the generation system 112 will be described.

The generation image acquisition unit 124 acquires several face images (hereinafter, also referred to as generation images) extracted at random to generate the model images and supplies the face images to the preliminary image process unit 125.

The preliminary image process unit 125 re-sizes the generation image from the generation image acquisition unit 124, like the re-size process of the sample image by the preliminary image process unit 122, cuts the part regions, and supplies the cut regions to the K-class determination unit 32.

The K-class determination unit 32 calculates the K-dimensional score vector corresponding to the part image in the part region supplied from the preliminary image process unit 125 and supplies the K-dimensional score vector to the generation unit 126.

The generation unit 126 classifies the part images into N (where N=1, 2, . . . , N) prototypes on the basis of the K-dimensional score vector supplied from the K-class determination unit 32 and generates the model image by calculating the average image of a part image group belonging to each prototype. The model image is registered in the database 35.

Next, the setting system 113 will be described.

The illustration image acquisition unit 127 acquires the illustration image of each part and supplies the illustration image to the setting unit 128.

The setting unit 128 sets the part matching information by matching the illustration images supplied from the illustration image acquisition unit 127 to the model images registered in the database 35. Then, the setting unit 128 registers the part matching information in the database 35. In addition, the setting unit 128 sets the anchor point definition information and registers the anchor point definition information in the database 35.

The preliminary process device 101 has the above-described configuration.

Description of Preliminary Process

Figure 12:
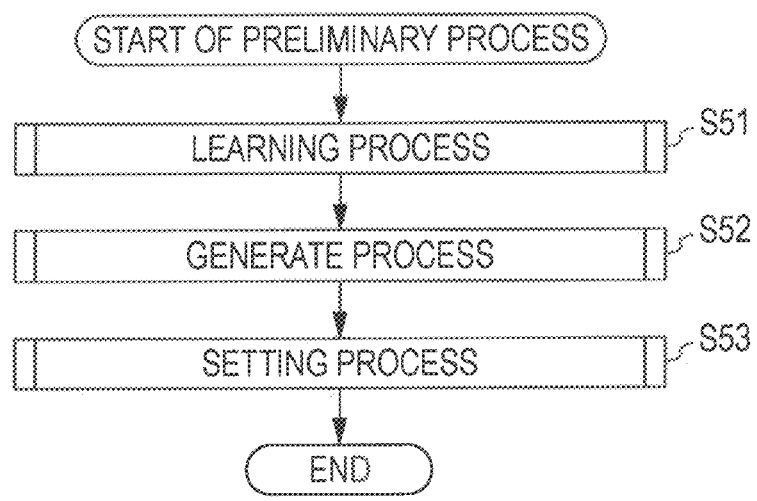
FIG. 12 is a flowchart illustrating the preliminary process.

Next, the preliminary process executed by the preliminary process device 101 in FIG. 11 will be described with reference to the flowchart of FIG. 12.

In step S51, the learning system 111 of the preliminary process device 101 executes the learning process to generate the K-class determination unit 32.

In step S52, the generation system 112 of the preliminary process device 101 generates the model images in response to the execution of the generation process and registers the model images in the database 35.

In step S53, the setting system 113 of the preliminary process device 101 sets the part matching information and the anchor point definition information by executing the setting process and registers the result in the database 35.

Figure 13:
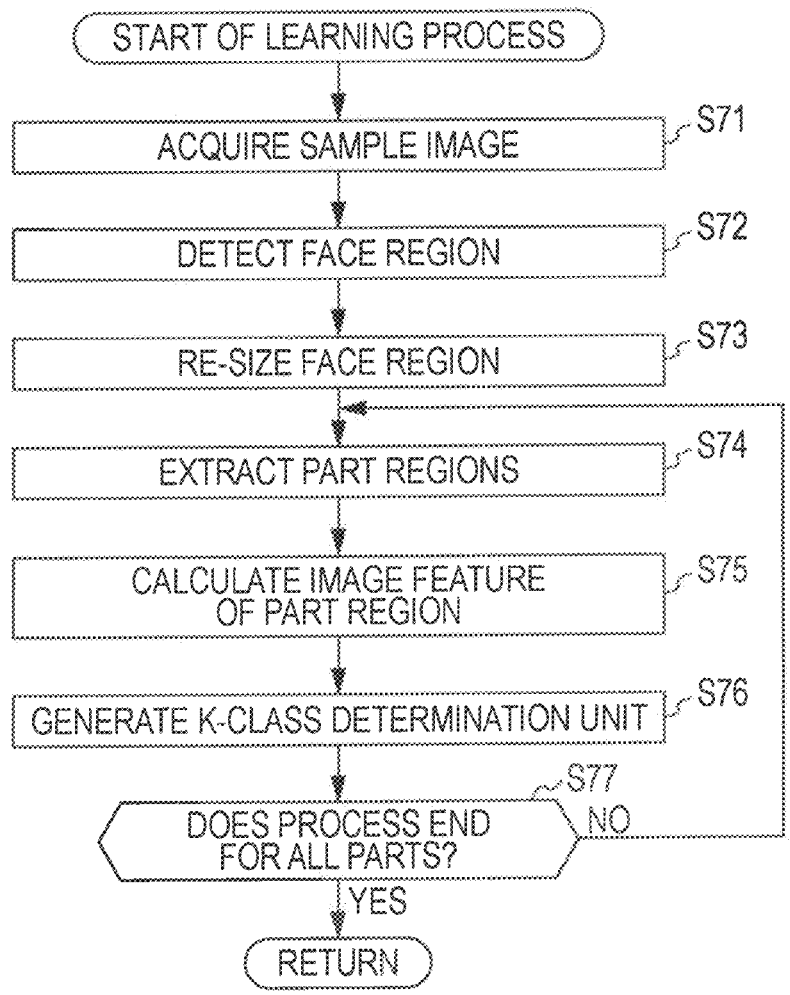
FIG. 13 is a flowchart illustrating a learning process.

Hereinafter, the above-described process from steps S51 to S53 of FIG. 12 will be described in detail.
Details of Learning Process FIG. 13 is a flowchart illustrating the learning process in detail.

In step S71, the learning sample acquisition unit 121 acquires the sample images prepared in various variations for K sample persons.

The preliminary image process unit 122 detects the face region from the sample image acquired by the learning sample acquisition unit 121 in step S72, re-sizes the detected face region to a predetermined image size (process of step S73) on the basis of the part region definition information, and then cuts the part region from the re-sized face region (process of step S74).

In this re-size process, the face region is re-sized to the size of 64 by 64 pixels, for example, in accordance with the image size defined in the part region definition information shown in FIG. 7. For example, the eye part regions (point (10, 23)-point (55, 30)) are cut.

In the learning unit 123, the image feature amount of the part image is calculated in step S75, and then the plural weak determiners are learned in accordance with AdaBoostECOC in step S76 to generate the K-class determination unit 32.

In the plural weak determiners determining whether to belong to each class, the image feature amount of the sample image (part image) is used as determination reference. As the image feature amount, for example, the pixel difference feature (PixDif Feature) suggested by the inventor may be used.

The pixel difference feature is disclosed in "Kohtaro Sabe and Kenichi Idai, "Learning Real-Time Arbitrary Position Face Detector Using Pixel Difference Feature", Proceedings of the 10th Symposium on Sensing, pp. 547 to 552, 2004" and Japanese Unexamined Patent Application Publication No. 2005-157679.

Figure 14:
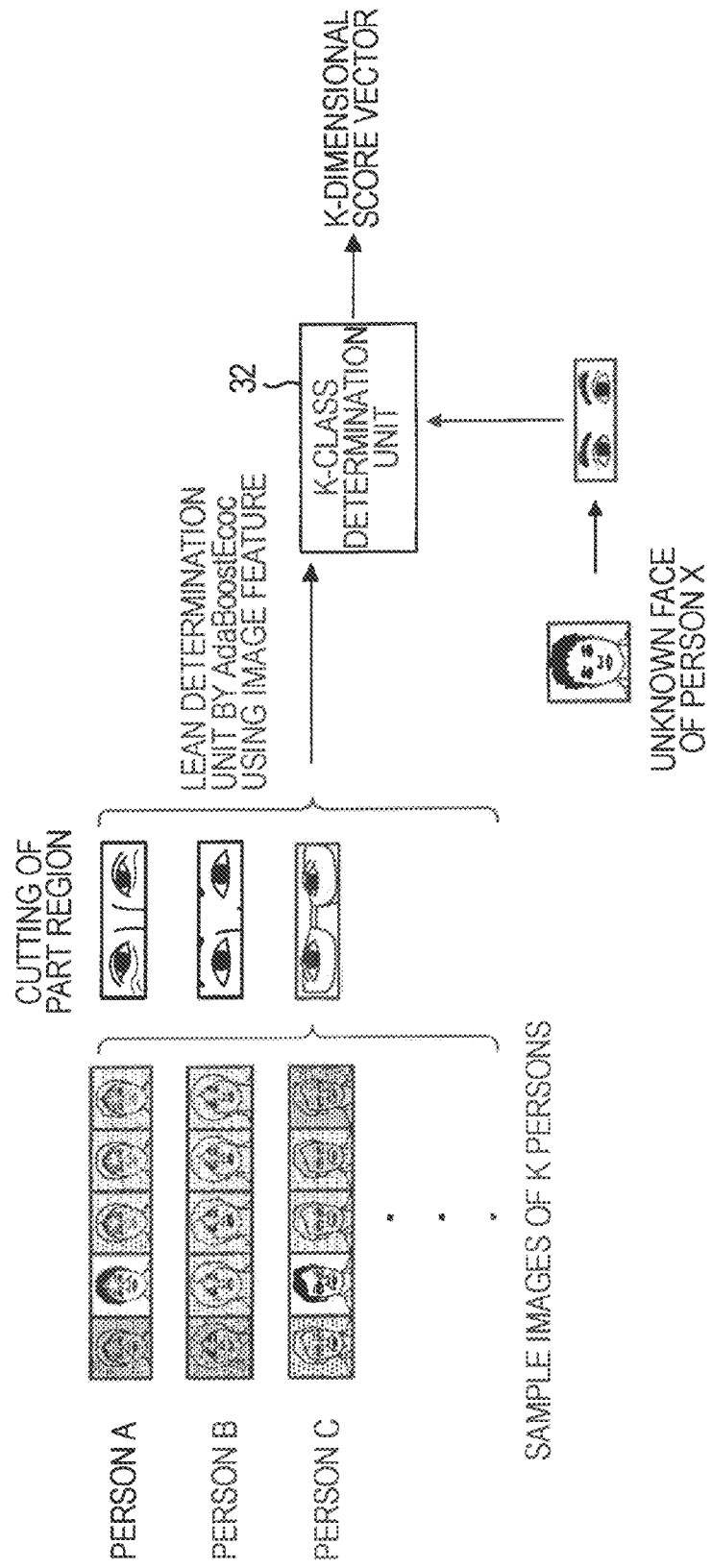
FIG. 14 is a diagram illustrating the details of a K-class determination unit.

FIG. 14 is a diagram illustrating the details of the K-class determination unit 32 generated by the learning unit 123.

As shown in FIG. 14, the sample images of K persons, such as "person A", "person B" and "person C", are acquired in various variations and the face regions of the sample images are re-sized. Thereafter, respective part regions are cut from the re-sized face regions, as described in the process from steps S71 to S74 of FIG. 13.

In the learning unit 123, the image feature amounts of the respective part images of the face images of the K sample persons are calculated in accordance with the pixel difference feature, the plural weak determiners are learned in accordance with AdaBoostECOC using the image feature amounts, and the K-class determination unit 32 is generated as the multi-class determiner.

The K-class determination unit 32 generated in this manner calculates a score expressing to what degree an input face image is similar to each of the K sample persons. Moreover, the input face image is more similar, as the value of the score is larger. Accordingly, as described above, the K-class determination unit 32 outputs the K-dimensional score vector as a K-dimensional score.

In this way, K-dimensional score spaces are obtained in each part. For example, when an input part image belongs to the same person, a distance in the K-dimensional score spaces is close. When an input face image belongs to an unknown person "X", each part of the person X" can be expressed numerically to show to what degree each part is similar to each part of the sample persons "A", "B", "C", and the like. Therefore, the similarity of each part can be determined in accordance with the distance in the K-dimensional score spaces of each part.

More specifically, the process in FIG. 15 is executed. That is, a difference $(I_1-I_2)$ between pixel values (luminance value) $I_1$ and $I_2$ of two pixels on the face image (Face Image A) is calculated to obtain the pixel difference feature (PixDif Feature). In a binary weak determiner h(x) corresponding to combination of two pixels, as indicated by Expression (1), true (+1) or false (−1) is determined by the pixel difference feature $(I_1-I_2)$ and a threshold value Th.

$$h(x) = -1 \quad \text{if } I_1 - I_2 \leq Th \qquad (1)$$
$$h(x) = +1 \quad \text{if } I_1 - I_2 > Th$$

An ECOC bit (which is a value (+1 or −1) of a K-th column stored in an ECOC table of first row and K-th column) defined in each class is compared to h(x) obtained from Expression (1). When the determination result is equal to the ECOC bit, the score of the class is increased by reliance degree α. In contrast, when the determination result is not equal to the ECOC bit, the score of the class is decreased by reliance degree α.

When this process is repeated by the number of image feature amounts, H(1), H(2), H(3), H(4), H(5), and the like can be calculated as the K-dimensional score vector (score of K-class).

Returning to the flowchart of FIG. 13, in step S77, the learning unit 123 determines whether the generation of the K-class determination unit 32 ends for all parts.

In step S77, when it is determined that the generation of the K-class determination unit 32 does not end for all parts, the process returns to step S74 and the generation process (process from steps S74 to S77), which is described above, is repeated.

That is, when the generation process is repeated, part regions such as an eye part region, an eyebrow part region, a nose part region, a mouth part region, and a forehead part region are separately extracted from the re-sized face region on the basis of the part region definition information shown in FIG. 7. Then, each K-class determination unit 32 is separately generated for each of the part regions.

The K-class determination unit 32 is obtained for each part region defined by the part region definition information shown in FIG. 7, and then the learning process ends.

Figure 16:
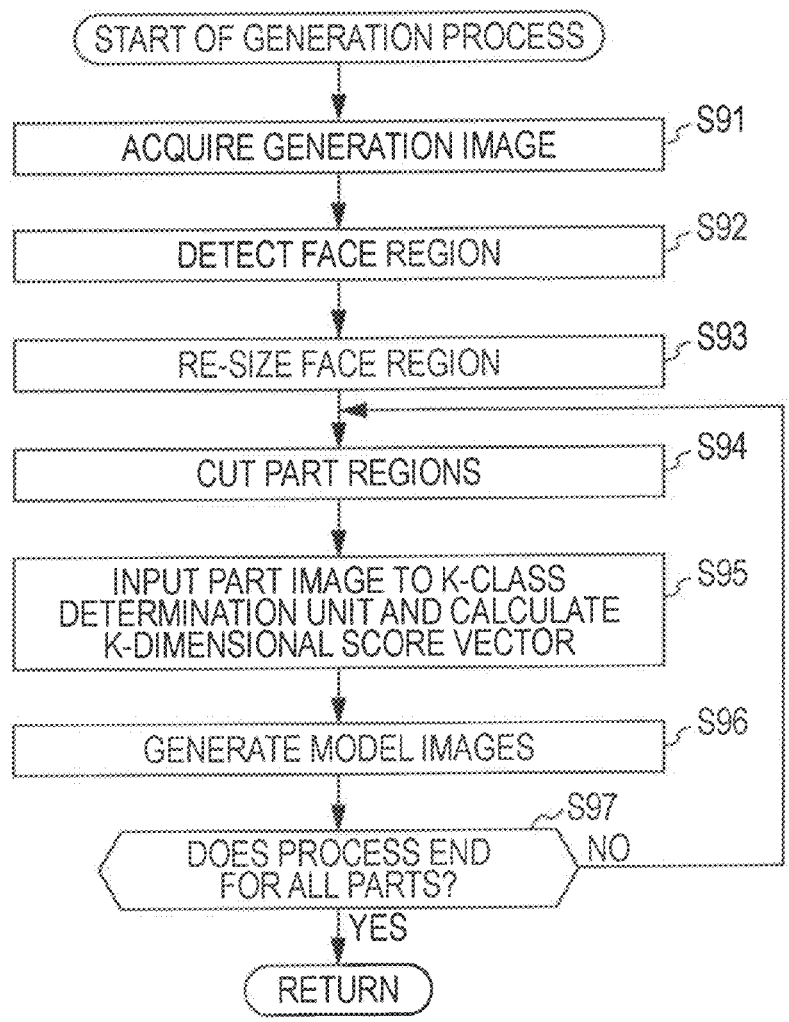
FIG. 16 is a flowchart illustrating a generation process.

The K-class determination unit 32 for each part generated in this manner can express the image feature amount of the input face image (part image) by using the K-dimensional score vector. For example, among the sample persons "A", "B", "C", and the like, each part of the unknown person "X" can be expressed numerically to what degree each part of the unknown person "X" is similar to each part of the sample persons "A", "B", "C", and the like.
Details of Generation Process FIG. 16 is a flowchart illustrating the details of the generation process.

Steps S91 to S94 are the same as steps S71 to S74 of FIG. 13. The face region of the generation image acquired by the generation image acquisition unit 124 is detected by the preliminary image process unit 125, and the part region is cut from the re-sized face region. As the generation image, for example, images containing face images extracted at random from 10000 images are used.

The part image obtained in this manner is input to the K-class determination unit 32 for each part. In step S95, the K-class determination unit 32 determines the pixel difference feature of the input part image as a threshold value, compares the pixel difference feature to the ECOC bit defined in each class to calculate the K-dimensional score vector.

In step S96, the generation unit 126 clusters the set of the K-dimensional score vectors corresponding to the part images calculated by the K-class determination unit 32 in the K-dimensional score spaces by use of the k-means algorithm, for example, and divides the set of the K-dimensional score vector into N subsets. In this way, since the part images are classified into N prototypes, the generation unit 126 generates the model images by calculating the average image of the part image group belonging to each of the classified prototypes, and registers the model images in the database 35.

Figure 17:
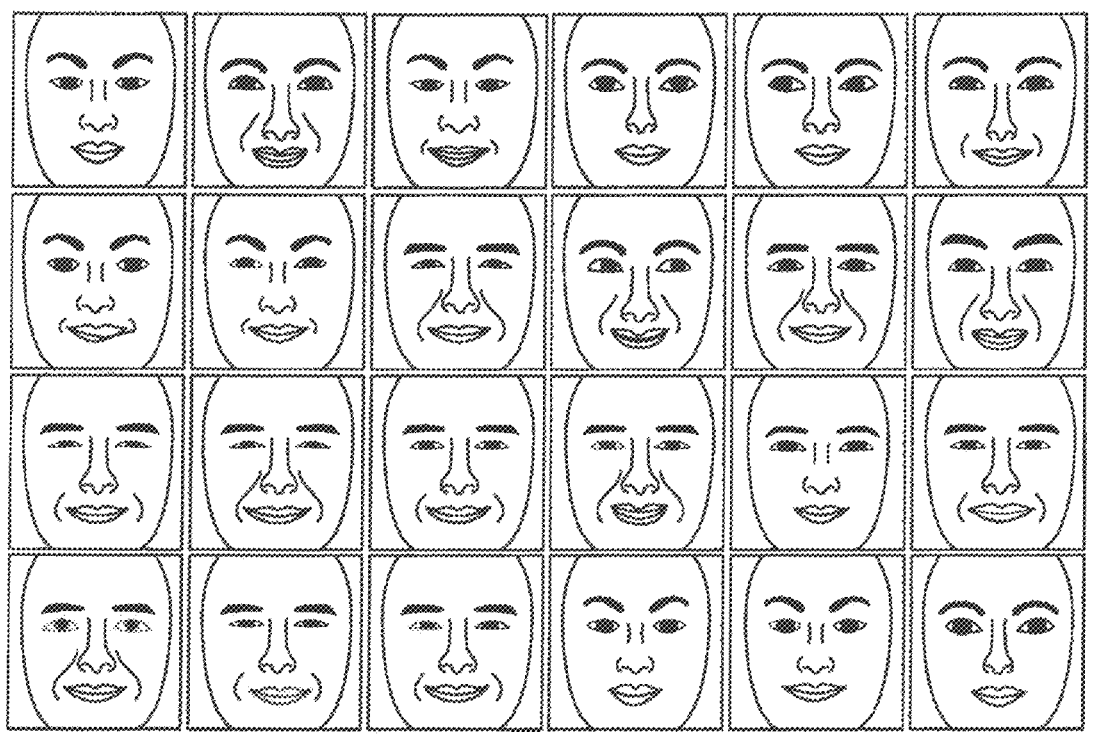
FIG. 17 is a diagram illustrating examples of eye model images.

FIG. 17 is a diagram illustrating examples of eye model images.

As shown in FIG. 17, when eye part images as a cluster of eyes are classified into twenty four prototypes, for example, an eye model image is formed by averaging the part image group belonging to each prototype. In the example of FIG. 17, in particular, the shapes of eyes are different for the model images of the prototypes.

Returning to the flowchart of FIG. 16, in step S97, the generation unit 126 determines whether the generation of the model images ends for all parts.

When it is determined that the generation of the model images does not end for all parts in step S97, the process returns to step S94 and the generation process (process from steps S94 to S97), which is described above, is repeated.

That is, when the generation process is repeated, the part regions such as an eyebrow part region, a nose part region, a mouth part region, and a forehead part region other than the above-described eye part region are separately extracted from the re-sized face region on the basis of the part region definition information shown in FIG. 7. Then, N model images are separately generated for each part region and are registered in the database 35.

In this way, N model images are obtained for each of the part regions defined by the part region definition information shown in FIG. 7 (in this case, it is not necessary for the number of model images to be equal for each part region). Then, the generation process ends.

Setting Process

Figure 18:
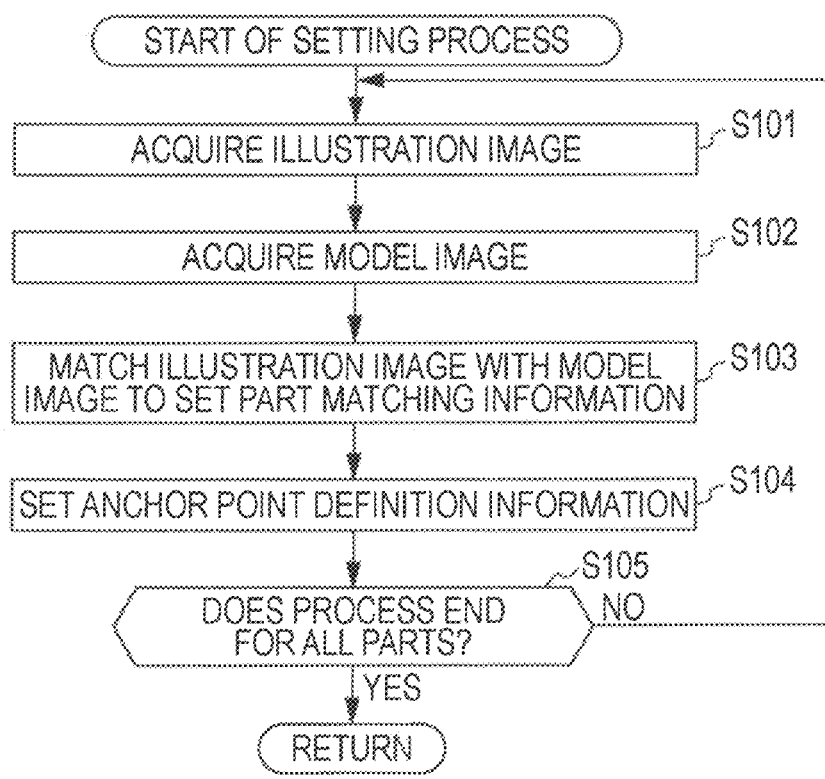
FIG. 18 is a flowchart illustrating a setting process.

FIG. 18 is a flowchart illustrating the setting process in detail.

In step S101, the illustration image acquisition unit 127 acquires the illustration image of each part. For example, when eye illustration images are set, illustration images varied in various forms of eyes among the parts forming the similar face picture image are prepared. For example the illustration images shown in FIGS. 19A to 19L are prepared.

In step S102, the setting unit 128 acquires the model images registered in the database 35. The model images are generated by the generation system 112 and are registered in the database 35 (the generation process in FIG. 16). For example, when the eye illustration images are set, the eye model images in FIG. 17 are acquired among the model images generated for respective part regions and registered in the database 35.

In step S103, the setting unit 128 sets the part matching information by matching the acquired illustration image to the model image and registers the part matching information in the database 35.

As a matching method, there are two methods: a first matching method of executing an image process to match a certain model image to the most similar illustration image in a group of candidate illustration images; and a second matching method of confirming a model image visually by a user, selecting the illustration image which is the most similar model image in a group of candidate illustration images by the user.

When the illustration image is matched to the model image by either of these methods, the illustration images (see FIGS. 19A to 19L) are matched to the model images (see FIG. 17), for example, as in FIG. 20. In the example of FIG. 20, each 6 by 4 illustration image can be matched to each 6 by 4 model image in accordance with the eye appearance. In this way, since the similarity can be calculated by patterns of the appearances of the part images and the model images rather than the geometric size or ratio of the parts, the similarity on which the subjective view of a person is perceived can be defined.

When a user executes the matching visually, the setting unit 128 can, for example, intentionally match a model image having a featured mouth to an illustration image having a feature in a mouth, as in FIG. 21A. Moreover, the setting unit 128 can intentionally match a model image having featured eyes to an illustration image having a feature in eyes, as in FIG. 21B.

In this way, when the part matching information is set, an illustration image having an expression more exaggerated than a real appearance may be allocated for the model image. Then, the similar face picture image (which is a similar face picture image in which facial features are further emphasized) having facial features of the subjective view of a person can be generated, when the similar face picture image is generated.

Returning to the flowchart of FIG. 18, in step S104, the setting unit 128 sets the anchor point definition information for each illustration image in accordance with an instruction of a user, for example, and registers the anchor point definition in the database 35.

As for the anchor point definition information, as described with reference to FIGS. 9A and 9B, when the part points $P_{P1}$ and $P_{P2}$ are disposed by setting the positions of the anchor points $P_{A1}$ and $P_{A2}$ more inwardly and further allowing the distance between anchor points $P_{A1}$ and $P_{A2}$ to be narrower than the distance between the part points $P_{P1}$ and $P_{P2}$, for example, larger eyes can be expressed even in the same eye illustration image due to the fact that the eye illustration image is expanded and then drawn. Alternatively, when the positions of the anchor points $P_{A1}$ and $P_{A2}$ are set more outwardly, the distance between the anchor points $P_{A1}$ and $P_{A2}$ is larger than the distance between the part points $P_{P1}$ and $P_{P2}$. Therefore, smaller eyes can be expressed even in the same illustration image due to the fact that, for example, the eye illustration image is contracted and then drawn.

In this way, since a part can be expressed in various forms even in the same illustration image just by changing the positions of the anchor points, it is possible to reduce the number of illustration images to be prepared. Moreover, it is possible to provide the transformed part image on which the feature of each part is perceived.

Moreover, the number of anchor points is not limited to two, but may be set in accordance with the number of corresponding part points.

In step S105, the setting unit 128 determines whether the setting of the part matching information and the anchor point definition information of all parts ends.

When it is determined the setting of the part matching information and the anchor point definition information of all parts does not end in step S105, the process returns to step S101 and the setting process (the process from steps S101 to S105), which is described above, is repeated.

That is, by repeating the setting process, each illustration image can be matched to each model image generated for each part region. Moreover, the anchor points of the illustration image can also be set separately.

Figure 22:
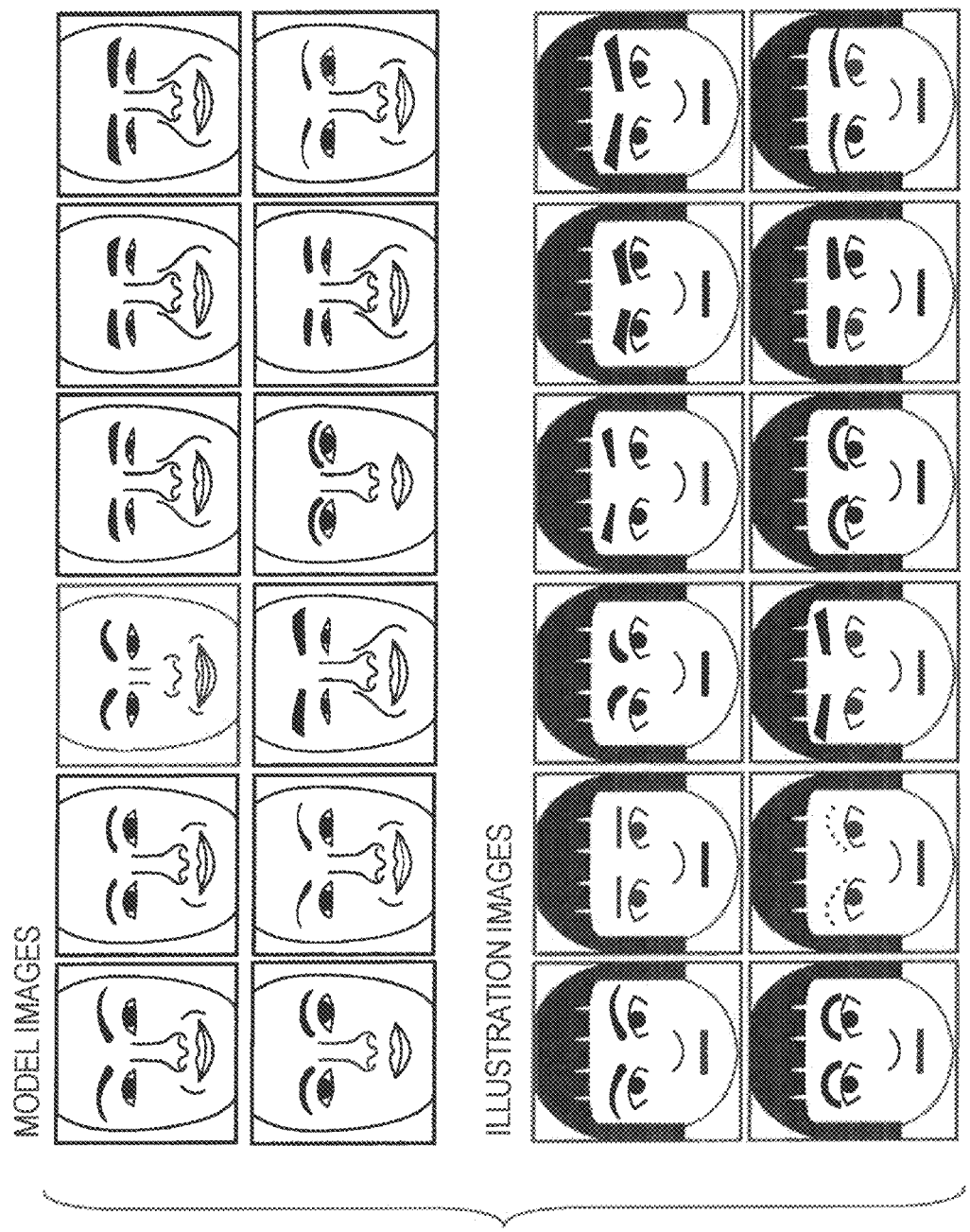
FIG. 22 is a diagram illustrating an example where eyebrow model images are matched to eyebrow illustration images.
Figure 23:
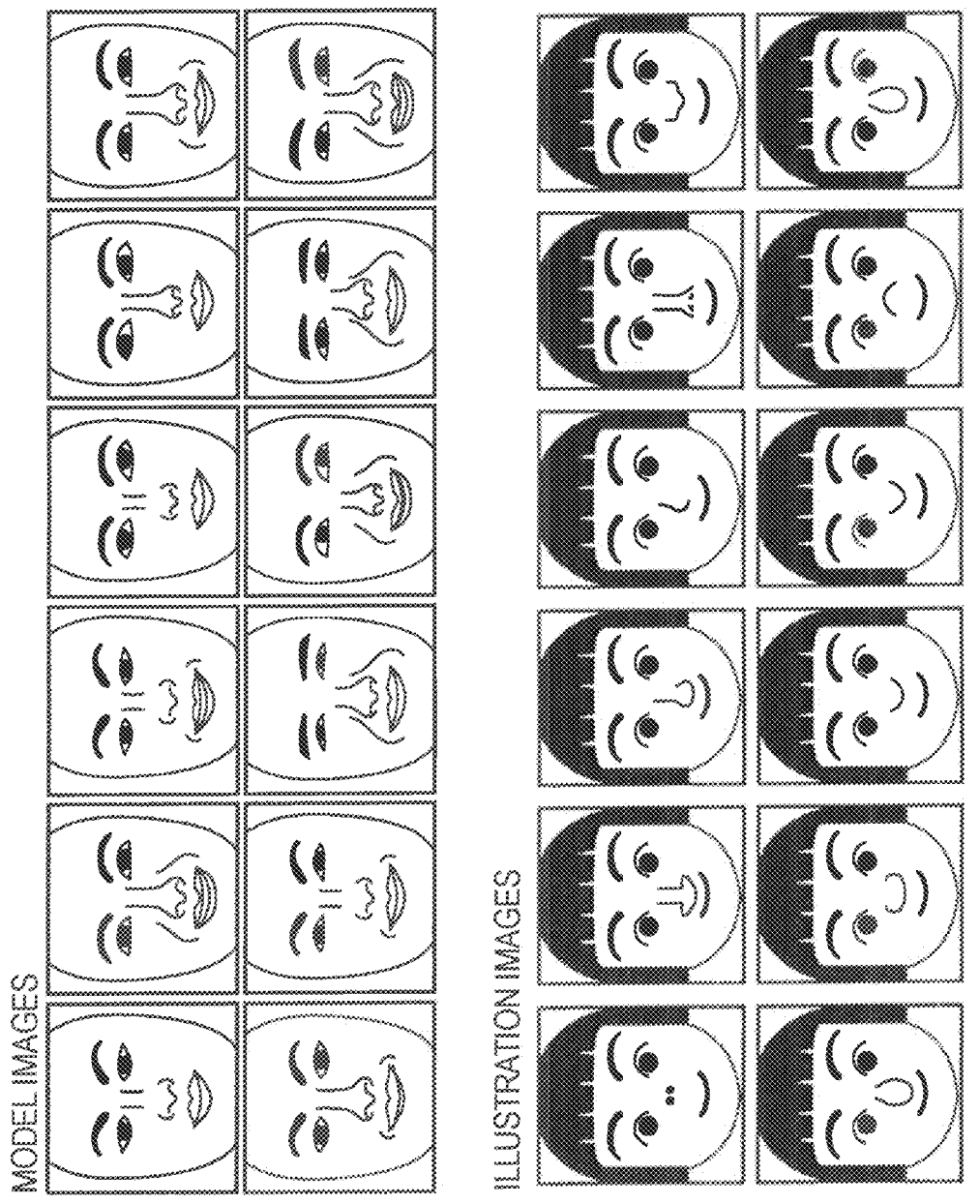
FIG. 23 is a diagram illustrating an example where nose model images are matched to nose illustration images.
Figure 24:
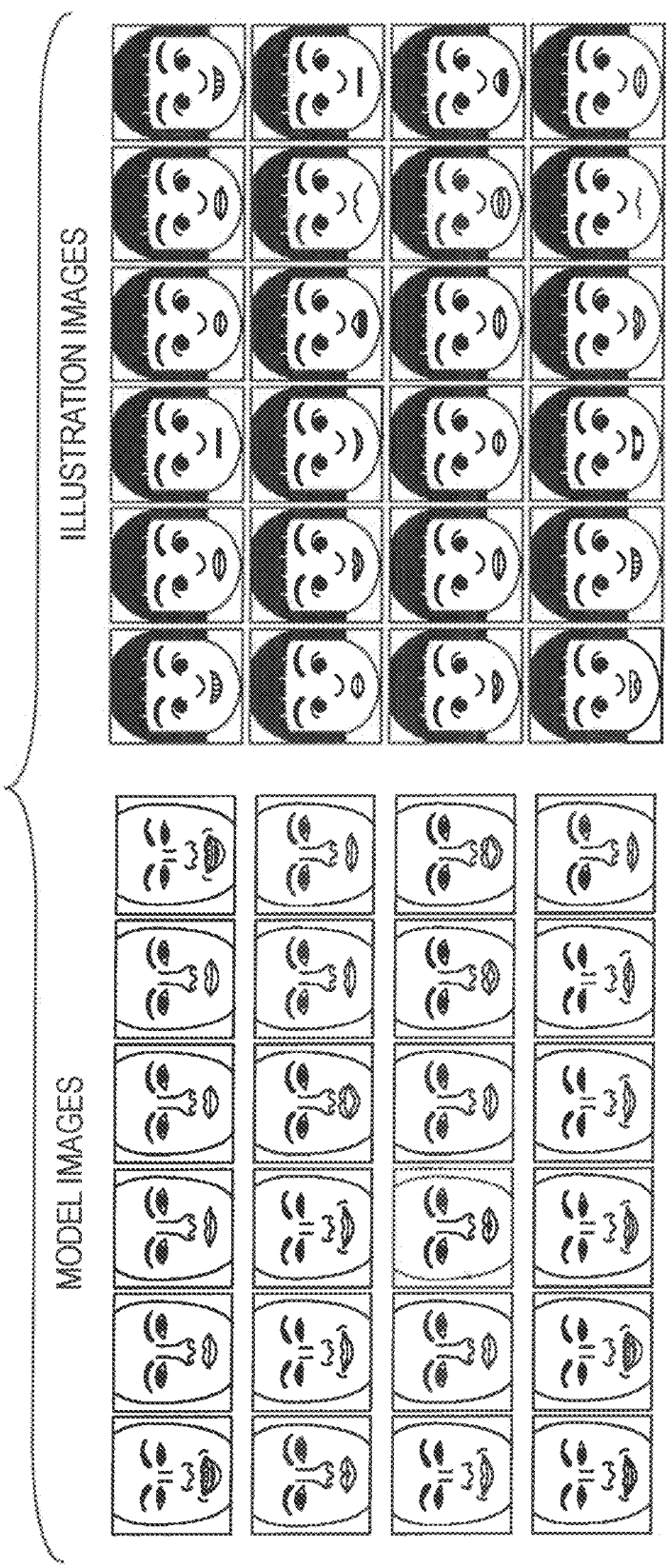
FIG. 24 is a diagram illustrating an example where mouth model images are matched to mouth illustration images.

FIGS. 22 to 24 show matching examples of the model images and the illustration images. FIG. 22 shows the matching example of eyebrows. FIG. 23 shows the matching example of a nose. FIG. 24 shows the matching example of a mouth.

As shown in FIG. 22, the eyebrow model images on the upper side of FIG. 22 are obtained by classifying the eyebrow part image into twelve prototypes as a cluster of eyebrows and averaging the part image group belonging to the prototypes. In the example of FIG. 22, in particular, the shapes of the eyebrows are different for the model images of the prototypes. The eyebrow illustration images on the lower side of FIG. 22 can be separately matched to the eyebrow model images by executing the setting process.

The same is applied to the examples of FIGS. 23 and 24, as in the example of the eyebrows in FIG. 22. That is, the nose illustration images can be separately matched to the nose model images in FIG. 23. Likewise, the mouth illustration images can be separately matched to the mouth model images in FIG. 24.

The information used for the matching by the setting process is registered as the part matching information in the database 35. In addition, the part matching information of all parts and the anchor point definition information are set, and then the setting process ends.

In the preliminary process device 101, the K-class determination unit 32 is generated for each part, and the part matching information and the anchor point definition information are set and registered in advance in the database 35. Then, the similar face picture image generation device 1 using the K-class determination unit 32 and the database 35 can generate the similar face picture image from the target image containing the face image without an operation of a user.

Other Examples of Class Division

Hitherto, the illustration images are matched to the model images in accordance with the part matching information. However, attribute information of sample persons may be given as class labels to the sample images and may be each learned by the K-class determination unit 32. An example of the attribute information of the sample persons is information belonging to the same attribute, as long as the information relates to a sample person of the same race, age classification, sex, presence or absence of glasses, or the like.

When the K-class determination unit 32 learning the attribute information as the class label is used, the part image and the model image can be featured in more detail in comparison to the case where the similarity between the part image and the model image is calculated. Therefore, since the similarity between the part image and the model image is calculated more accurately, an accurate illustration image can be selected.

In this embodiment, the similar face picture image generation device 1 in FIG. 1 is a different device from the preliminary process device 101 in FIG. 11. However, the similar face picture image generation device 1 and the preliminary process device 101 may be considered as one device including a similar face picture image generation unit as one process unit corresponding to the similar face picture image generation device 1 in FIG. 1 and a preliminary process unit as one process unit corresponding to the preliminary process device 101 in FIG. 11. In this case, the K-class determination unit 32 and the database 35 included in this device are generated (set) by the preliminary process unit and are used in the similar face picture image generation process of the similar face picture image generation unit.

In this embodiment, the similar face picture image generation device 1 and the display device 2 in FIG. 1 are different from each other. However, a display unit as one process unit corresponding to the display device 2 may be included in the similar face picture image generation device 1. In this case, the drawing generation unit 17 displays the generated similar face picture image on a screen of the display unit.

The similar face picture image generated by the drawing generation unit 17 is displayed on the screen of the display device 2. Moreover, the similar face picture image may also be compressed by a predetermined compression method such as the JPEG method and may be stored as a file in a predetermined record medium.

The above-described series of processes may be executed by hardware or software. When the series of processes are executed by software, the program configured by the software is installed from a program record medium in a computer embedded with exclusive-use hardware or, for example, a general personal computer capable of executing various functions by installing various programs.

FIG. 25 is a diagram illustrating an exemplary configuration of a personal computer executing the above-described series of processes in accordance with a program. A CPU (Central Processing Unit) 211 executes various processes in accordance with a program recorded in a ROM (Read-Only Memory) 212 or a memory unit 218. The RAM (Random Access Memory) 213 appropriately stores the program executed by the CPU 211 or data. The CPU 211, the ROM 212, and the RAM 213 are connected to each other via a bus 214.

An input/output interface 215 is connected to the CPU 211 via the bus 214. An input unit 216 formed by a microphone or the like and an output unit 217 formed by a display, a speaker, or the like are connected to the input/output interface 215. The CPU 211 executes various processes in accordance with an instruction input from the input unit 216. The CPU 211 outputs the process result to the output unit 217.

The memory unit 218 connected to the input/output interface 215 is formed by a hard disk drive or the like and stores the program executed by the CPU 211 or a variety of data. A communication unit 219 communicates with an external device via a network such as the Internet or a local area network.

A program may be acquired via the communication unit 219 and may be stored in the memory unit 218.

When a removable media 221 such as a magnetic disk, an optical disk, a magneto-optical disk, or a semiconductor memory is mounted, a drive 220 connected to the input/output interface 215 drives the removable media 221 and acquires a program, data, or the like stored in the removable media 221. The acquired program or data is transmitted and stored in the memory unit 218, as necessary.

As shown in FIG. 25, a program record medium storing a program installed in a computer and executable by the computer includes the removable media 221 as a package media formed by a magnetic disk (including a flexible disk), an optical disk (including a CD-ROM (Compact Disc-Read Only Memory) and a DVD (Digital Versatile Disc)), a magneto-optical disk, a semiconductor memory, or the like, the ROM 212 storing a program temporarily or permanently, and the hard disk drive forming the memory unit 218. The program may be stored in the program record medium using a wired or wireless communication medium such as a local area network, the Internet, or digital satellite broadcasting via the communication unit 219 which is an interface such as a router or a modem, as necessary.

In the specification, steps describing the program stored in the record medium include not only a step which is executed in time-series in recorded order but also a step which is not necessarily executed in time-series but is executed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   circuitry configured to
      acquire a two-dimensional (2D) target image;
      extract a face region including a face part from the 2D target image;
      identify a 2D real-image model face part by comparing the face part to a plurality of 2D real-image model face parts stored in a storage unit; and
      determine a 2D illustration image corresponding to the 2D real-image model face part identified by comparing the face part to the plurality of 2D real-image model face parts stored in the storage unit.

2. The information processing apparatus according to claim 1, wherein the circuitry is configured to extract the face region by scanning a face pattern of the 2D target image.

3. The information processing apparatus according to claim 1, wherein the circuitry is configured to determine that glasses exist in the 2D target image.

4. The information processing apparatus according to claim 3, wherein the circuitry is configured to determine an illustration image corresponding to the glasses.

5. The information processing apparatus according to claim 1, wherein the circuitry is configured to extract a hair region from the 2D target image.

6. The information processing apparatus according to claim 5, wherein the circuitry is configured to determine an illustration image corresponding to the hair region.

7. The information processing apparatus according to claim 1, wherein the circuitry is configured to extract a face contour from the face region.

8. The information processing apparatus according to claim 1, wherein the circuitry is configured to resize the face region including the face part, and cut the face part from the resized face region.

9. The information processing apparatus according to claim 8, wherein the circuitry is configured to calculate a score vector corresponding to the face part cut from the resized face region.

10. The information processing apparatus according to claim 9, wherein the circuitry is configured to identify the 2D real-image model face part by comparing the calculated score vector to a plurality of score vectors corresponding to each of the plurality of 2D real-image model face parts stored in the storage unit.

11. The information processing apparatus according to claim 1, wherein the circuitry is configured to rotate or resize the 2D illustration image so that a plurality of reference points on a contour of the 2D illustration image match a plurality of points on a contour of the extracted face part.

12. A non-transitory computer-readable medium including computer program instructions, which when executed by an information processing apparatus, cause the information processing apparatus to perform a method, the method comprising:
   acquiring a two-dimensional (2D) target image;
   extracting a face region including a face part from the 2D target image;
   identifying a 2D real-image model face part by comparing the face part to a plurality of stored 2D real-image model face parts;
   determining a 2D illustration image corresponding to the 2D real-image model face part identified by comparing the face part to the plurality of stored 2D real-image model face parts.

13. The non-transitory computer-readable medium according to claim 12, wherein:
   the identifying further includes resizing the face region including the face part, and cutting the face part from the resized face region.

14. The non-transitory computer-readable medium according to claim 13, wherein:
   the identifying further includes calculating a score vector corresponding to the face part cut from the resized face region.

15. The non-transitory computer-readable medium according to claim 14, wherein:
   the identifying further includes identifying the model face part by comparing the calculated score vector to a plurality of score vectors corresponding to each of the plurality of model face parts stored in the storage unit.

16. An image generating method performed by an information processing apparatus, the method comprising:
   acquiring, by circuitry of the information processing apparatus, a two-dimensional (2D) target image;
   extracting, by the circuitry, a face region including a face part from the 2D target image;
   identifying, by the circuitry, a 2D real-image model face part by comparing the face part to a plurality of 2D real-image model face parts stored in a storage unit; and
   determining, by the circuitry, a 2D illustration image corresponding to the 2D real-image model face part identified by comparing the face part to the plurality of 2D real-image model face parts stored in the storage unit.

17. The method according to claim 16, wherein:
   the identifying further includes resizing the face region including the face part, and cutting the face part from the resized face region.

18. The method according to claim 17, wherein:
   the identifying further includes calculating a score vector corresponding to the face part cut from the resized face region, and identifying the 2D real-image model face part by comparing the calculated score vector to a plurality of score vectors corresponding to each of the plurality of 2D real-image model face parts stored in the storage unit.

19. An information processing apparatus comprising:
   means for acquiring a two-dimensional (2D) target image;
   means for extracting a face region including a face part from the 2D target image;
   means for identifying a 2D real-image model face part by comparing the face part to a plurality of 2D real-image model face parts stored in a storage unit;
   means for determining an illustration image corresponding to the 2D real-image model face part identified by comparing the face part to the plurality of 2D real-image model face parts stored in the storage unit.

* * * * *